(12) United States Patent
Brigg et al.

(10) Patent No.: US 12,475,056 B2
(45) Date of Patent: *Nov. 18, 2025

(54) MANAGING ACCESS TO MEMORY BY DETERMINING VIRTUAL ADDRESSES IN DEPENDENCE ON ACCESS REQUEST TYPE

(71) Applicant: Imagination Technologies Limited, Kings Langley (GB)

(72) Inventors: Robert Brigg, Watford (GB); Lorenzo Belli, Watford (GB)

(73) Assignee: Imagination Technologies Limited, Kings Langley (GB)

( * ) Notice: Subject to any disclaimer, the term of this patent is extended or adjusted under 35 U.S.C. 154(b) by 129 days.

This patent is subject to a terminal disclaimer.

(21) Appl. No.: 18/205,023

(22) Filed: Jun. 2, 2023

(65) Prior Publication Data

US 2023/0315645 A1 Oct. 5, 2023

Related U.S. Application Data

(63) Continuation of application No. 17/338,466, filed on Jun. 3, 2021, now Pat. No. 11,669,460, which is a
(Continued)

(30) Foreign Application Priority Data

Jun. 29, 2018 (GB) ...................................... 1810779

(51) Int. Cl.
*G06F 12/1009* (2016.01)
*G06F 12/02* (2006.01)
*G06T 1/60* (2006.01)

(52) U.S. Cl.
CPC ........ *G06F 12/1009* (2013.01); *G06F 12/023* (2013.01); *G06T 1/60* (2013.01); *G06F 2212/652* (2013.01); *G06F 2212/657* (2013.01)

(58) Field of Classification Search
CPC ............... G06F 12/1009; G06F 12/023; G06F 2212/652; G06F 2212/657
See application file for complete search history.

(56) References Cited

U.S. PATENT DOCUMENTS 5,860,144 A 1/1999 Frank et al.
8,601,223 B1 * 12/2013 Yuan .................. G06F 12/1027
711/170
(Continued)

FOREIGN PATENT DOCUMENTS

CN 102110196 A 6/2011
JP 2006178764 A 7/2006

OTHER PUBLICATIONS

Lefohn et al., "A Streaming Narrow-Band Algorithm: Interactive Computation and Visualization of Level Sets," IEEE Transactions on Visualization and Computer Graphics, 2004 (Note: NPL in parent application).

*Primary Examiner* — Scott T Baderman
(74) *Attorney, Agent, or Firm* — Potomac Law Group, PLLC; Vincent M DeLuca

(57) ABSTRACT

A method of managing access to a physical memory formed of n memory page frames using a set of virtual address spaces having n virtual address spaces each formed of a plurality p of contiguous memory pages. The method includes receiving a write request to write a block of data to a virtual address within a virtual address space i of the n virtual address spaces, the virtual address defined by the virtual address space i, a memory page j within that virtual address space i and an offset from the start of that memory page j; translating the virtual address to an address of the physical memory using a virtual memory table having n by p entries specifying mappings between memory pages of the virtual address spaces and memory page frames of the physical memory, wherein the physical memory address is
(Continued)

defined by: (i) the memory page frame mapped to the memory page j as specified by the virtual memory table, and (ii) the offset of the virtual address; and writing the block of data to the physical memory address.

20 Claims, 11 Drawing Sheets

Related U.S. Application Data continuation of application No. 16/457,975, filed on Jun. 29, 2019, now Pat. No. 11,042,486.

(56) References Cited

U.S. PATENT DOCUMENTS

| | | | |
|---|---|---|---|
| 10,120,812 B2* | 11/2018 | Sivaprakasam | G06F 12/1009 |
| 2001/0020264 A1 | 9/2001 | Belgard | |
| 2005/0132249 A1 | 6/2005 | Burton et al. | |
| 2005/0193169 A1 | 9/2005 | Ahluwalia | |
| 2006/0117162 A1* | 6/2006 | Sauber | G06F 12/10 |
| | | | 711/E12.058 |
| 2007/0106875 A1* | 5/2007 | Mather | G06F 12/1009 |
| | | | 711/E12.059 |
| 2007/0126756 A1* | 6/2007 | Glasco | G06F 12/1027 |
| | | | 345/620 |
| 2015/0127923 A1 | 5/2015 | Miller et al. | |
| 2016/0260193 A1 | 9/2016 | Richards et al. | |
| 2017/0075582 A1* | 3/2017 | van Riel | G06F 12/10 |
| 2017/0178280 A1* | 6/2017 | Fishwick | G06T 1/20 |
| 2017/0206169 A1 | 7/2017 | Coppola et al. | |
| 2018/0024938 A1* | 1/2018 | Paltashev | G06F 12/128 |
| | | | 711/133 |
| 2019/0042410 A1 | 2/2019 | Gould et al. | |
| 2019/0171565 A1 | 6/2019 | Bowen-Huggett | |

* cited by examiner

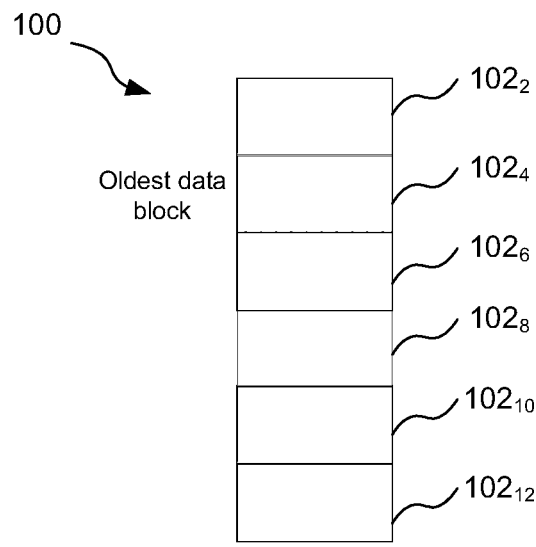
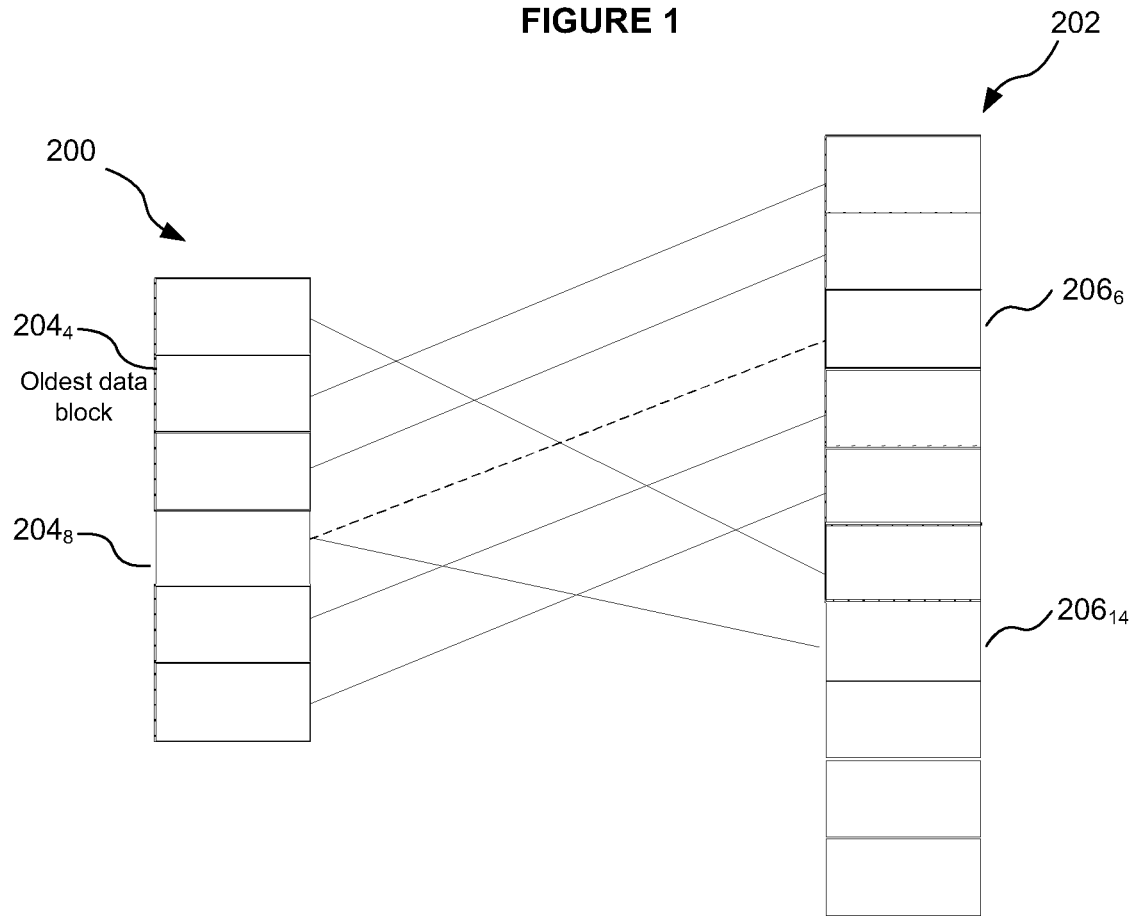
FIGURE 1
FIGURE 2

MANAGING ACCESS TO MEMORY BY DETERMINING VIRTUAL ADDRESSES IN DEPENDENCE ON ACCESS REQUEST TYPE

CROSS-REFERENCE TO RELATED APPLICATIONS AND CLAIM OF PRIORITY

This application is a continuation under 35 U.S.C. 120 of copending application Ser. No. 17/338,466 filed Jun. 3, 2021, now U.S. Pat. No. 11,669,460, which is a continuation of prior application Ser. No. 16/457,975 filed Jun. 29, 2019, now U.S. Pat. No. 11,042,486, which claims foreign priority under 35 U.S.C. 119 from United Kingdom Application No. 1810779.7 filed Jun. 29, 2018, the contents of which are incorporated herein by reference in their entirety.

This invention relates to managing a virtual memory through a virtual memory addressing scheme.

BACKGROUND

Effectively managing access to, and storage within, computer memory is an important factor to the performance of computer processing systems such as central processing units (CPUs), or graphics processing units (GPUs).

FIG. 1 shows an example region of computer memory 100. Memory 100 may form part of a wider computer processing system (not shown in FIG. 1). Memory 100 could for example be a memory forming part of an IC chip (i.e., it may be an on-chip memory). The memory 100 is shown partitioned into a plurality of blocks, or chunks $102_2$, $102_4$, $102_6$, $102_8$, $102_{10}$ and $102_{12}$. Each block may be the smallest addressable unit of memory 100. Alternatively or in addition, each block may represent the smallest contiguous portion of memory 100 that can be allocated/deallocated at a time.

One approach to manage the allocation of blocks within memory 100 may be referred to as circular management. In circular management, data is first written to the blocks 102 according to some specified block order. Once a block is full, data is written to the next block specified by the block order. For example, data may first be written to block $102_4$. Once block $102_4$ is full, data is then written to block $102_6$, followed by block $102_8$ (once block $102_6$ is full), block $102_{10}$ (once block $102_8$ is full), block $102_{12}$ (once block $102_{10}$ is full) and then back to block $102_2$ (once block $102_{12}$ is full), and so on in a cyclic manner.

A block may become free when the data stored within the block is no longer required by the processing resources of the computer processing systems of which the memory 100 forms part. When a block becomes free, data can be written to the block at the expense of the data previously stored in the block. For example, the data previously stored in the block may be flushed from the memory when it is no longer required. Alternatively, rather than actively flushing data when it is no longer required, data may be written to the block to overwrite the data previously stored in that block. A free block may also be referred to as a deallocated block, i.e. a block that is free for reuse and not allocated to a resource of the computer processing system.

With circular management, a free block can only be subsequently re-allocated when that free block is the oldest block in the memory; i.e. the block in the memory that has held its data from a previous allocation the longest. However, in practice, any block within the memory may be freed, e.g. when it is no longer required. This can lead to the situation where the memory contains free blocks, but those blocks cannot be re-allocated because there is an older (non-free) block in the memory. This is illustrated schematically in FIG. 1. In FIG. 1, block $102_8$ has become free, however block $102_4$ is the oldest data block within the memory 100. Thus, under a circular management scheme, block $102_8$ would not be able to be re-allocated despite being a free block. This may be referred to as the 'wrap-around problem'.

One approach to alleviate the above-described problem is through use of a virtual memory. Virtual memory uses a virtual address space that defines virtual addresses that are translated to physical memory addresses (i.e. addresses within a physical memory of the computer processing system). A resource of the computer processing system references a virtual memory address (e.g. in a write or read operation). A memory management unit can then translate the virtual memory address to a physical memory address in order to perform the operation on the physical memory.

FIG. 2 shows an example mapping between a physical memory 200 and virtual memory 202. Memory 200 is partitioned into a number of blocks of contiguous memory referred to as memory page frames. Virtual memory 202 is partitioned into a plurality of contiguous blocks of virtual memory referred to as pages. Each memory page frame of the memory 200 maps to a respective page of virtual memory 202. The mappings between memory page frames of the memory 200 and pages of virtual memory 202 may be stored in a page table. The mappings between page frames of memory 200 and pages of virtual memory 202 are illustrated in FIG. 2 by the interconnecting lines between the physical memory 200 and virtual memory 202. A page of virtual memory may be of equal size (i.e., be formed of the same number of bits) as a memory page frame of physical memory, but need not be.

A virtual address may be defined by a page of virtual memory and an offset specified relative to that page. To translate the virtual address to a physical memory address (which may be referred to herein as a 'physical address' for brevity), the page of virtual memory is mapped to a memory page frame of physical memory using the page table. The physical address can then be specified from the specified page frame and the offset of the virtual address.

The virtual memory 202 may also be managed using a circular management scheme, but to alleviate the wrap-around problem, the address space of the virtual memory can be made larger than the address space of the physical memory (i.e. there may be more virtual addresses than physical addresses). There may therefore be a greater number of virtual pages than memory page frames, e.g. as shown in FIG. 2. This approach can improve memory usage by avoiding the need to wait for a specific page of memory 200 to be freed before it can be reallocated. This is illustrated schematically in FIG. 2. The mappings between the page frames of memory 200 and pages of virtual memory 202 are illustrated by the interconnecting lines. Page frame $204_4$ is the oldest page frame in memory 200; i.e., the page frame that has not been deallocated for the longest period of time. Page frame $204_8$ is initially mapped to page $206_6$ of the virtual memory (illustrated by the dashed line). Page frame $204_8$ subsequently becomes a deallocated, or free, memory page frame, e.g. because virtual page $206_6$. is deallocated, or freed. Free physical page frames may be mapped arbitrarily to virtual pages, since the circular management scheme is not used for physical page frames. Therefore, despite not being the oldest data block in memory 200, page frame $204_8$ can subsequently be allocated to the free page $206_{14}$ under the circular management scheme for virtual pages. Thus, the provision of virtual memory 202 enables page frame $204_8$ to be allocated despite the oldest page frame $204_4$ not being deallocated. In other words, the virtual memory can be allocated from in a circular fashion. Because the virtual address space can be made larger than the physical address space, the wrap around problem happens much later in virtual memory than it does when a circular management scheme is used on the physical memory, increasing the likelihood that, by the time wrap around happens the oldest block in the virtual memory has been released.

It can therefore be appreciated that the provision of a virtual memory with a larger address space than the address space of physical memory can alleviate the wrap-around problem described above. However, some problems with this approach remain. Because the virtual address space is larger than the physical address space, a greater number of bits are required to specify a virtual address than a physical address. In addition, though the virtual address space is larger than the physical address space, the wrap-around problem still persists (albeit to a lesser extent). Though this can be mitigated with a larger virtual address space, increasing the virtual address space increases the number of bits of each virtual address.

SUMMARY

According to the present disclosure there is provided a method of managing access to a physical memory formed of n memory page frames using a set of n virtual address spaces each formed of a plurality p of contiguous memory pages, the method comprising: receiving a write request to write a block of data to a first virtual address within a first virtual address space i of the set of n virtual address spaces, the first virtual address defined by the first virtual address space i, a first memory page j within that first virtual address space i and an offset from that first memory page j; translating the first virtual address to an address of the physical memory using a virtual memory table having n by p entries specifying mappings between memory pages of the virtual address spaces and memory page frames of the physical memory; the physical memory address defined by the memory page frame mapped to the first memory page j as specified by the virtual memory table, and the offset of the first virtual address; and writing the block of data to the physical memory address.

Each virtual address space may have an index uniquely identifying that address space within the set of n virtual address spaces, and each memory page frame of the physical memory may have an index uniquely identifying that memory page frame within the physical memory, each virtual address space index being mapped to a respective memory page frame index.

Each entry of the virtual memory table may be associated with a respective memory page within the set of n virtual address spaces.

The virtual memory table may be an array formed of n sets of p contiguous entries, each of the n sets of p contiguous entries being associated with the p memory pages within a respective virtual address space.

The method may further comprise, if the block of data exceeds available space of the memory page frame in physical memory mapped to the first memory page j within the first virtual address space i:
  selecting a further memory page frame from a list of available memory page frames;
  specifying in the virtual memory table a mapping between the further memory page frame and a second memory page k in the first virtual address space i contiguous with the first memory page j; and
  writing remaining data of the block of data to the further memory page frame.

The method may further comprise, after the block of data has been written to the physical memory:
  receiving a request for a new virtual address to write to;
  determining a second virtual address in response to the request, the second virtual address defined by a second virtual address space i' different to the first virtual address space i, a memory page j' within the second virtual address space i', and an offset from said memory page j'; and
  specifying in the virtual memory table a mapping between the memory page j' for the second virtual address within the second virtual address space i' and a memory page frame of the physical memory.

The request may be a first type of request or a second type of request, the first type of request requesting the new virtual address correspond to the same page frame of physical memory as the last page frame the block of data is written to, and the second type of request requesting the new virtual address correspond to a new page frame of physical memory.

The step of determining the second virtual address may comprise selecting a memory page frame of the physical memory in dependence on the type of request received; and selecting as the second virtual address space i' the virtual address space having an index that maps to the index of the selected memory page frame.

The method may further comprise, in response to receiving the first type of request:
  selecting the last memory page frame the block of data was written to; and
  specifying in the virtual memory table a mapping between said memory page frame and a memory page in the second virtual address space i'.

The step of determining the second virtual address may comprise selecting as the second virtual address space i' the virtual address space with the index that maps to the index of the last memory page frame the block of data was written to.

The step of determining the second virtual address may further comprise setting the offset of the second virtual address to be equal to the offset of the end of the block of data from the last memory page frame the block of data was written to.

The step of determining the second virtual address may further comprise selecting as the memory page j' within the second virtual address space i' a terminal memory page within the second virtual address space i'.

The method may further comprise, in response to receiving the second type of request:
  selecting a memory page frame from a list of available memory page frames;
  and specifying in the virtual memory table a mapping between the selected memory page frame and a memory page in the second virtual address space i'.

The step of determining the second virtual address space may comprise selecting as the second virtual address space i' the virtual address space with the index that maps to the index of the selected memory page frame.

The step of determining the second virtual address may comprise setting the offset of the new virtual address to be zero in response to receiving the second type of request.

The step of determining the second virtual address may further comprise selecting as the memory page j' within the second virtual address space i' a terminal memory page within the second virtual address space.

The physical memory may be accessed as part of implementing a graphics pipeline.

The physical memory may be a vertex buffer storing primitive data for primitives processed as part of the graphics pipeline.

The method may further comprise:
maintaining a count value for each memory page frame indicating the number of primitives having data stored within that memory page frame that are active/referenced within the graphics pipeline; and
adding a memory page frame to the list of available memory page frames when the count value for that memory page frame indicates there are no primitives referenced within the graphics pipeline that have data stored within that memory page frame.

There may be provided a memory management unit for managing access to a physical memory formed of n memory page frames using a set of n virtual address spaces each formed of a plurality p of contiguous memory pages, the memory management unit comprising:
a storage unit for storing a virtual memory table having n by p entries specifying mappings between memory pages of the virtual address spaces and memory page frames of the physical memory; and
a controller configured to:
receive a write request to write a block of data to a first virtual address within a first virtual address space i of the set of n virtual address spaces, the first virtual address defined by the first virtual address space i, a memory page j within that first virtual address space i and an offset from that memory page j;
translate the first virtual address to an address of the physical memory using the virtual memory address table, the physical memory address defined by the memory page frame mapped to the first memory page j as specified by the virtual memory table, and the offset of the first virtual address; and
write the block of data to the physical memory address.

Each virtual address space may have an index uniquely identifying that address space within the set of n virtual address spaces, and each memory page frame of the physical memory may have an index uniquely identifying that memory page frame within the physical memory, each virtual address space index being mapped to a respective memory page frame index.

Each entry of the virtual memory table may be associated with a respective memory page within the set of n virtual address spaces.

The virtual memory table may be an array formed of n sets of p contiguous entries, each of the n sets of p contiguous entries being associated with the p memory pages within a respective virtual address space.

The controller may be further configured to, if the block of data exceeds available space of the memory page frame in physical memory mapped to the first memory page j within the first virtual address space i:
select a further memory page frame from a list of available memory page frames;
specify in the virtual memory table a mapping between the further memory page frame and a second memory page k in the first virtual address space i contiguous with the first memory page j; and
write remaining data of the block of data to the further memory page frame.

The memory management unit may further comprise an address calculating unit configured to, responsive to the controller receiving a request for a new virtual address after the block of data has been written to the physical memory:
determine a second virtual address, the second virtual address defined by a second virtual address space i' different to the first virtual address space i, a memory page j' within the second virtual address space i', and an offset from said memory page j'; and
specify in the virtual memory table a mapping between the memory page j' for the second virtual address within the second virtual address space i' and a memory page frame of the physical memory.

The request may be a first type of request or a second type of request, the first type of request requesting the new virtual address correspond to the same page frame of physical memory as the last page frame the block of data is written to, and the second type of request requesting the new virtual address correspond to a new page frame of physical memory.

The address calculating unit may be configured to determine the second virtual address by:
selecting a memory page frame of the physical memory in dependence on the type of request received; and
selecting as the second virtual address space i' the virtual address space having an index that maps to the index of the selected memory page frame.

The address calculating unit may be configured to, responsive to the controller receiving a first type of request:
select the last memory page frame the block of data was written to; and
specify in the virtual memory table a mapping between said memory page frame and a memory page in the second virtual address space i'.

The address calculating unit may be configured to select as the second virtual address space i' the virtual address space with the index that maps to the index of the last memory page frame the block of data was written to.

The address calculating unit may be configured to set the offset of the new virtual address to be equal to the offset of the end of the block of data from the last memory page frame the block of data was written to.

The address calculating unit may be configured to select as the memory page j' within the second virtual address space i' a terminal memory page within the second virtual address space i'.

The address calculating unit may be configured to, responsive to the controller receiving a second type of request:
select a memory page frame from a list of available memory page frames; and
specify in the virtual memory table a mapping between the selected memory page frame and a memory page in the second virtual address space i'.

The address calculating unit may be configured to set the offset of the new virtual address to be zero in response to receiving the second type of request.

The address calculating unit may be configured to select as the second virtual address space i' the virtual address space with the index that maps to the index of the selected memory page frame.

The address calculating unit may be configured to select as the memory page j' within the second virtual address space i' a terminal memory page within the second virtual address space.

The memory management unit may form part of a graphics processing system configured to implement a graphics pipeline, the memory management unit being configured to access the physical memory as part of implementing the graphics pipeline.

The physical memory may be a vertex buffer storing primitive data for primitives processed as part of the graphics pipeline.

The memory management unit may further comprise a plurality of counters for maintaining a count value for each memory page frame indicating the number of primitives having data stored within that memory page frame that are active/referenced within the graphics pipeline, the controller being configured to add a memory page frame to the list of available memory page frames when the count value for that memory page frame indicates there are no primitives referenced within the graphics pipeline that have data stored within that memory page frame.

There may be provided a memory management unit configured to perform any of the methods herein.

The memory management unit may be embodied in hardware on an integrated circuit.

There may be provided method of manufacturing, using an integrated circuit manufacturing system, a memory management unit according to any of the examples herein.

There may be provided a method of manufacturing, using an integrated circuit manufacturing system, a memory management unit according to any of the examples herein, the method comprising:
  processing, using a layout processing system, a computer readable description of the graphics processing system so as to generate a circuit layout description of an integrated circuit embodying the memory management unit; and
  manufacturing, using an integrated circuit generation system, the memory management unit according to the circuit layout description.

There may be provided computer program code for performing any of the methods herein.

There may be provided a non-transitory computer readable storage medium having stored thereon computer readable instructions that, when executed at a computer system, cause the computer system to perform any method herein.

There may be provided an integrated circuit definition dataset that, when processed in an integrated circuit manufacturing system, configures the integrated circuit manufacturing system to manufacture a memory management unit according to any of the examples herein.

There may be provided a non-transitory computer readable storage medium having stored thereon a computer readable description of a memory management unit according to any of the examples herein that, when processed in an integrated circuit manufacturing system, causes the integrated circuit manufacturing system to manufacture an integrated circuit embodying the memory management unit.

There may be provided a computer readable storage medium having stored thereon a computer readable description of a memory management unit according to any of the examples herein which, when processed in an integrated circuit manufacturing system, causes the integrated circuit manufacturing system to:
  process, using a layout processing system, the computer readable description of the memory management unit so as to generate a circuit layout description of an integrated circuit embodying the memory management unit; and
  manufacture, using an integrated circuit generation system, the memory management unit according to the circuit layout description.

There may be provided an integrated circuit manufacturing system configured to manufacture a memory management unit according to any of the examples herein.

There may be provided an integrated circuit manufacturing system comprising:
  a non-transitory computer readable storage medium having stored thereon a computer readable description of a memory management unit according to any of the examples herein;
  a layout processing system configured to process the computer readable description so as to generate a circuit layout description of an integrated circuit embodying the memory management unit; and
  an integrated circuit generation system configured to manufacture the memory management unit according to the circuit layout description.

BRIEF DESCRIPTION OF THE DRAWINGS

Examples will now be described in detail with reference to the accompanying drawings in which:

FIG. 1 shows an example of a physical memory partitioned into blocks;

FIG. 2 shows a schematic illustration of the mapping between pages of a virtual memory and page frames of a physical memory;

DETAILED DESCRIPTION

The present disclosure is directed to a virtual memory addressing scheme. The virtual memory addressing scheme addresses a virtual memory formed of a set of n virtual address spaces. Each virtual memory address space is formed of a plurality p of contiguous virtual memory pages (referred to herein simply as 'pages' for brevity). A page can be mapped to a page frame of physical memory. The physical memory is partitioned into n page frames; i.e. in this example the number of virtual address spaces is equal to the number of page frames of the physical memory. The n page frames of physical memory may be contiguous. It is noted that in the examples described in detail herein, the number of virtual address spaces is equal to the number of page frames of the physical memory, but more generally, the number of virtual address spaces can be equal to or greater than the number of page frames of the physical memory.

A virtual address of the virtual memory is specified by both the virtual address space and a page within that virtual address space. Thus, for example, pages having an equal page index but belonging to different virtual address spaces form different virtual addresses. This contrasts with conventional virtual memory addressing schemes, in which a virtual memory mapped to a physical memory is formed of only a single virtual address space formed of a plurality of contiguous pages.

Mappings between pages of the virtual memory and page frames of the physical memory are specified in a virtual memory table. The virtual memory table contains n by p entries (i.e. n×p entries), where each entry corresponds to a respective page of the virtual memory. That is, each entry of the virtual memory table is associated with a respective page of the virtual memory. Each entry can store a single mapping between its corresponding page of virtual memory and a page frame of physical memory. The virtual memory can be arranged as an array. The array can be composed of n sets of p contiguous entries, where each set of p contiguous entries is associated with the p contiguous pages within a respective virtual address space.

Addresses to the virtual memory are translated to physical memory addresses using the virtual memory table. As will be explained in more detail below, the provision of a virtual memory formed of multiple address spaces each formed of multiple pages enables the wrap-around problem described above to be avoided. Various other advantages of the disclosed virtual memory addressing scheme will be explained in the following.

In the following examples, the virtual memory addressing scheme will be described in the context of a graphics processing system. It will be appreciated that this is for the purposes of illustration only, and that the principles of the present disclosure can be equally applied within other computer processing systems.

Figure 3:
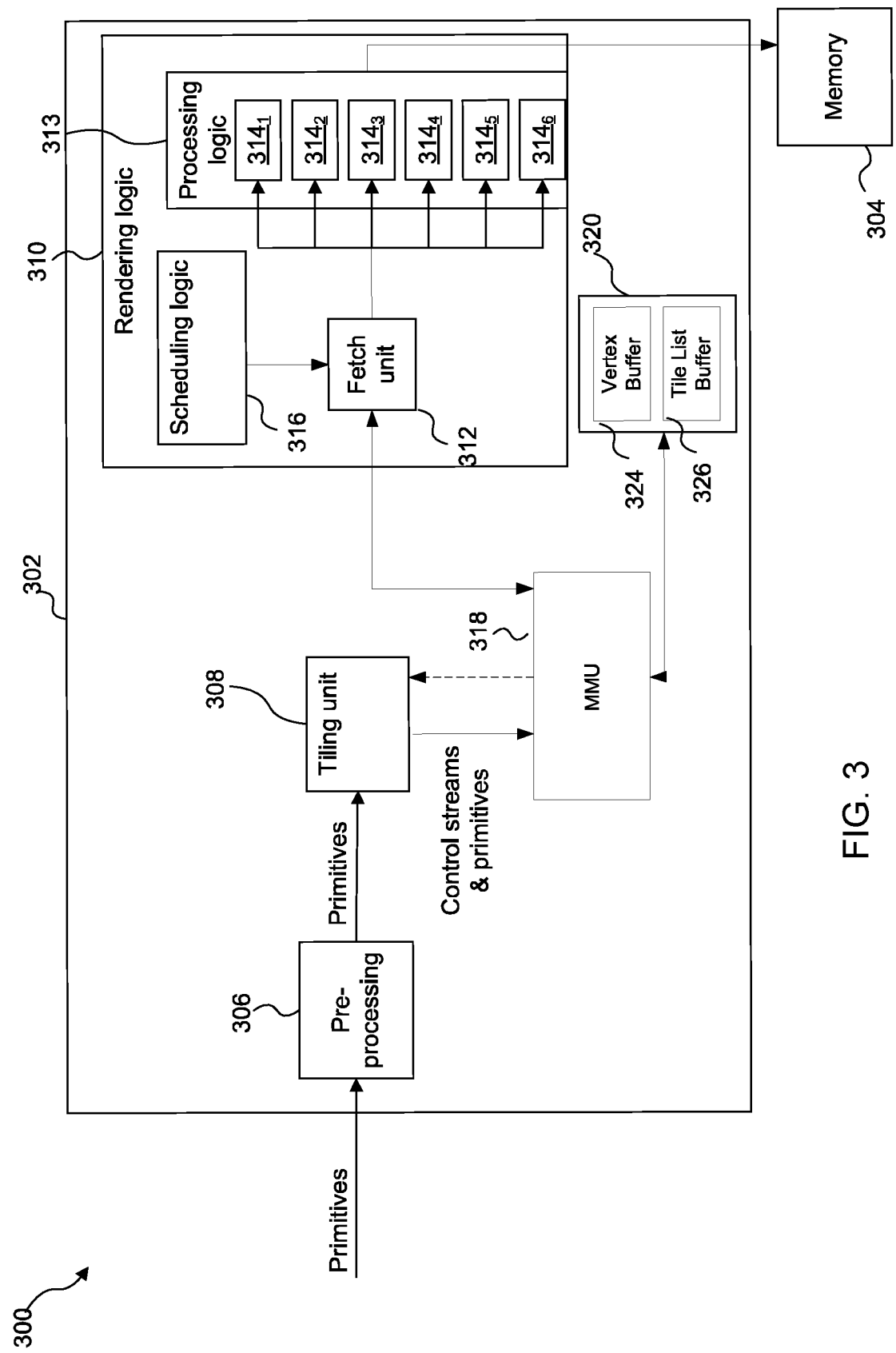
FIG. 3 shows a graphics processing system.

FIG. 3 shows some elements of a graphics processing system 300 which may be used to process graphics data to render an image of a scene (e.g. a 3D scene).

Graphics processing system 300 is a tile-based graphics system. Tile-based graphics processing systems typically operate in two phases: a geometry processing phase and a rendering phase. In the geometry processing phase, the graphics data for a render is analysed to determine, for each of the tiles, which graphics data items are present within that tile. Then in the rendering phase, a tile can be rendered by processing those graphics data items which are determined to be present within that tile (without needing to process graphics data items which were determined in the geometry processing phase to not be present within the particular tile). The graphics data items may represent geometric shapes, which describe surfaces of structures in the scene, and which are referred to as "primitives". A common primitive shape is a triangle, but primitives may be other 2D shapes or may be lines or points also. Objects can be composed of one or more (e.g. hundreds, thousands or millions) of such primitives.

The graphics processing system 300 comprises a graphics processing unit (GPU) 302 and a portion of memory 304.

The GPU 302 comprises a pre-processing module 306, a tiling unit 308, a memory management unit (MMU) 318, a memory portion 320, and rendering logic 310. The memory portion 320 may be referred to as an on-chip memory. It is a physical memory. The memory portion 320 stores data generated by the tiling unit 308 for use by the rendering logic 310. The memory portion 320 may include one or more buffers. In this example, the memory portion 320 includes a vertex buffer 324 and a tile list buffer 326.

The tiling unit 308 writes data to the memory portion 320 using a virtual memory addressing scheme. The MMU 318 operates to manage allocation of memory within the memory portion 320 by suitable assignment of page frames within the memory 320 to pages of virtual memory addressed by the tiling unit 308. The MMU 318 also operates to translate virtual addresses referenced by the tiling unit 308 to addresses of the memory portion 320 to enable data to be written from the tiling unit to the memory 320. This will be explained in greater detail below.

The rendering logic 310 comprises a fetch unit 312, processing logic 313 which includes processing cores $314_{1-6}$ and scheduling logic 316. The rendering logic 310 is configured to use the processing cores 314 to implement hidden surface removal (HSR) and texturing and/or shading on graphics data (e.g. primitive fragments) for tiles of the rendering space. Though the rendering logic is shown as including six processing cores in this example, it will be appreciated that in general the rendering logic may include one or more processing cores, e.g. in a range from 1 to 256, or even higher. The number of processing cores in the rendering logic 310 may be adapted to suit the intended use of the graphics processing system (e.g. a graphics processing system to be used in a small mobile device which has tight constraints on processing resources and silicon size may include a small number of processing cores (e.g. 6 processing cores), whereas a graphics processing system to be used in a large device such as a PC or server which has less tight constraints on processing resources and silicon size may include a larger number of processing cores (e.g. 128 processing cores)).

The graphics processing system 300 is arranged such that a sequence of primitives provided by an application is received at the pre-processing module 306. In a geometry processing phase, the pre-processing module 306 performs functions such as geometry processing including clipping and culling to remove primitives which do not fall into a visible view. The pre-processing module 306 may also project the primitives into screen-space. The primitives which are output from the pre-processing module 306 are passed to the tiling unit 308 which determines which primitives are present within each of the tiles of the rendering space of the graphics processing system 300. The tiling unit 308 assigns primitives to tiles of the rendering space by creating control streams (or "display lists") for the tiles, wherein the control stream for a tile includes indications of primitives which are present within the tile.

The control streams and data for the primitives are outputted from the tiling unit 308 and stored in the memory 320. The control streams are stored in the tile list buffer 326. The data for the primitives indicated in the control streams is stored in the vertex buffer 324. The primitive data may be organized into primitive blocks. Each primitive block may contain a list of indices for a set of primitives and vertex data for the vertices of those primitives. The vertex data may include, for example, vertex coordinates. The use of primitive blocks conveniently enables vertex data for vertices shared between primitives within the same primitive block to be stored only once in the vertex buffer, thereby reducing memory requirements.

Thus, in summary, the vertex buffer 324 may store a plurality of primitive blocks, and the tile list buffer 326 may store a control stream for each tile indicating the primitives located at least partially within that tile. Each control stream may indicate the primitives located within a tile through primitive IDs, where each primitive ID is formed from: (i) a primitive block ID indicating the primitive block the primitive is located within, and (ii) an in-block ID identifying the primitive within that primitive block. In this way the control streams for each tile can reference the primitive blocks of primitives located within that tile.

To write the control streams and primitive data to the memory 320, the tiling unit 308 may issue one or more write requests. Each write request may request that a block of data be written to a virtual memory address. Each write request is received by the MMU 318, which operates to translate the virtual memory address specified in the request to an address of memory 320 to enable the block of data to be written to the memory 320.

In a rendering phase, the rendering logic 310 renders graphics data for tiles of the rendering space to generate values of a render, e.g. rendered image values. The rendering logic 310 may be configured to implement any suitable rendering technique. In this example, the rendering logic implements rasterization to perform the rendering, but in other examples may perform ray tracing. In order to render a tile, the fetch unit 312 fetches the control stream for a tile and the primitives relevant to that tile from the memory 320.

The fetch unit 312 fetches data from the memory 320 using the virtual memory addressing scheme. To fetch the control steam and primitive data for a tile, the fetch unit may issue one or more read requests. A read request may alternatively be referred to herein as a fetch request. Fetch requests issued by the fetch unit 312 to fetch data from the memory 320 are received by the MMU 318. Each request may be a request for data stored at a particular virtual memory address. The MMU 318 operates to translate that virtual memory address to an address of the memory 320 to enable data stored at that translated address to be fetched and passed to the fetch unit 312.

The rendering unit 310 may implement rasterisation according to a deferred rendering technique, such that one or more of the processing core(s) 314 are used to perform hidden surface removal to thereby remove fragments of primitives which are hidden in the scene, and then one or more of the processing core(s) 314 are used to apply texturing and/or shading to the remaining primitive fragments to thereby form rendered image values. The term "fragment" refers to a sample of a primitive at a sampling point, which is to be processed for rendering pixels of an image. In some examples, there may be a one to one mapping of sample positions to pixels. In other examples there may be more sample positions than pixels, and this oversampling can allow for higher quality rendering of pixel values, e.g. by facilitating anti-aliasing and other filtering that may be applied to multiple fragments for rendering each of the pixel values. The texturing and/or shading performed on the fragments which pass the HSR stage determines pixel colour values of a rendered image which can be passed to the memory 304 for storage in a frame buffer. Texture data may be received at the rendering logic 310 from the memory 320 in order to apply texturing to the primitive fragments. Shader programs may be executed to apply shading to the primitive fragments. The texturing/shading process may include applying further processing to the primitive fragments (e.g. alpha blending and other processes) to determine rendered pixel values of an image. The rendering logic 310 processes primitives in each of the tiles and when the whole image has been rendered and stored in the memory 304, the rendered image can be outputted from the graphics processing system 300 and used in any suitable manner, e.g. displayed on a display or stored in memory or transmitted to another device, etc.

In some systems, a particular processing core can be used to perform hidden surface removal at one point in time and texturing/shading at another point in time. In some other systems, some of the processing cores are dedicated for performing hidden surface removal whilst others of the processing cores are dedicated for performing texturing and/or shading on primitive fragments.

The graphics processing system 300 described above is a deferred rendering system because the rendering logic 310 is configured to perform the HSR processing on a primitive fragment before the texturing/shading processing is applied to the primitive fragment. Other graphics processing systems are not deferred rendering system in the sense that they are configured to perform the texturing and/or shading of primitive fragments before the HSR is performed on those primitive fragments. Deferred rendering systems avoid the processing involved in applying texturing and/or shading to at least some of the primitive fragments which are removed by the hidden surface removal process.

If the rendering logic 310 includes more than one processing core 314 then the processing cores can process different data in parallel, thereby improving the efficiency of the rendering logic 310. In some systems, the tiles are assigned to processing cores of the rendering logic 110, such that the graphics data for rendering a particular tile is processed in a single processing core. The graphics data for rendering a different tile may be processed by a different, single processing core. Processing a particular tile on a single processing core (rather than spreading the processing of the particular tile across multiple cores) can have benefits such as an improved cache hit rate. Multiple tiles may be assigned to the same processing core, which can be referred to as having "multiple tiles in flight". When all of the tiles for a render have been processed by the rendering logic 310, the render is complete. Then the results of the render (e.g. a rendered frame) can be used as appropriate (e.g. displayed on a display or stored in a memory or transmitted to another device, etc.), and the rendering logic 310 can process tiles of a subsequent render. The allocation of tiles to processing cores is controlled by the scheduling logic 316.

The virtual memory addressing scheme implemented by the graphics processing system 300 will now be described in more detail. The addressing scheme will be described with reference to the mapping between the virtual memory and physical memory vertex buffer 324. It will be appreciated that this is for the purposes of illustration only and that the following techniques equally apply to other buffers within the memory portion 320, such as the tile list buffer 326.

Figure 4:
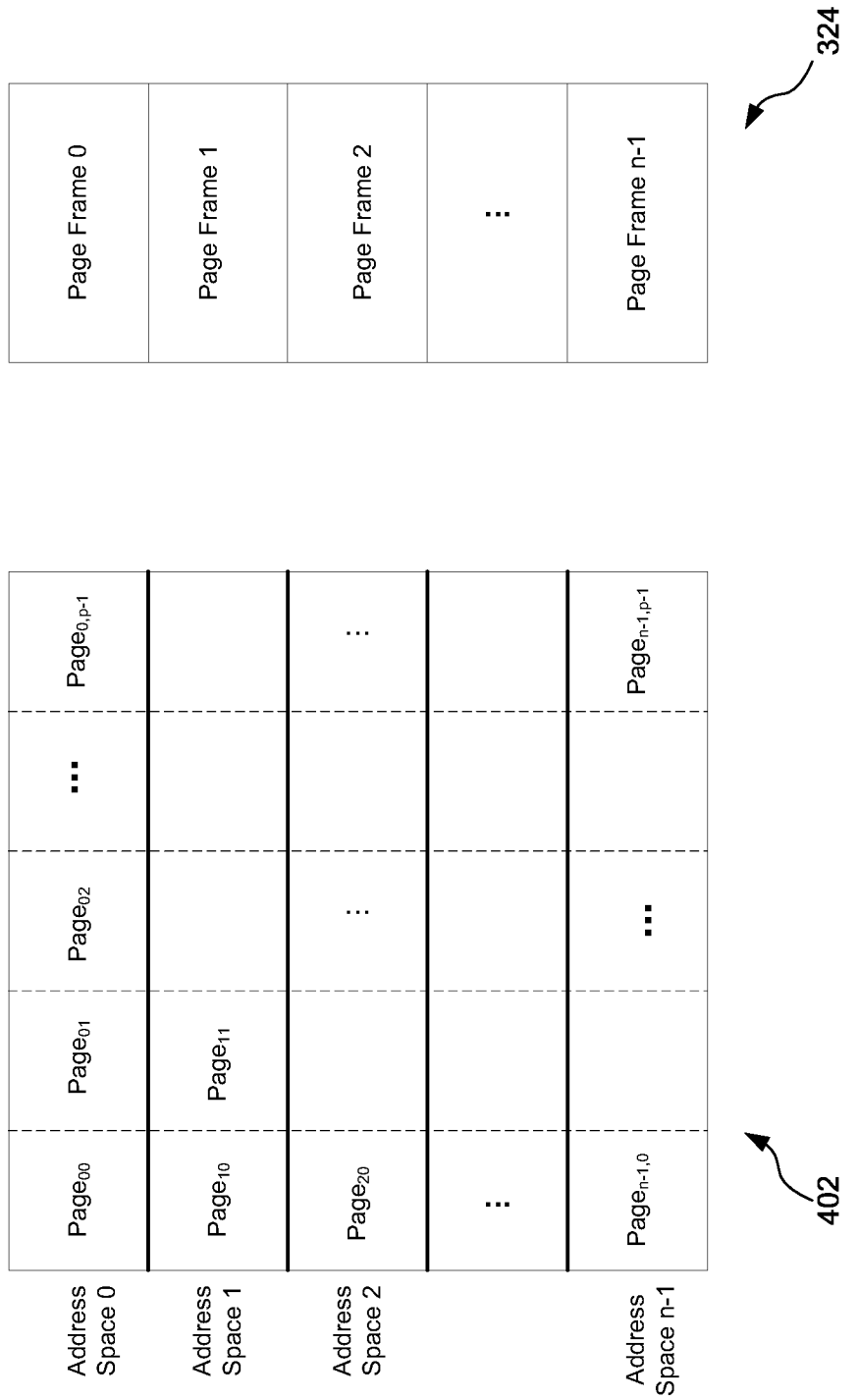
FIG. 4 shows a virtual memory and a physical memory.

FIG. 4 shows a schematic illustration of the physical vertex buffer memory 324 and the virtual memory 402 addressable by the tiling unit 308 and fetch unit 312.

The vertex buffer 324 is partitioned into a plurality of n page frames. Each page frame is a contiguous block of physical memory of the buffer 324. The n page frames may be contiguous blocks of memory (as shown in this example) but need not be. Each page frame may store one or more primitive blocks written from the tiling unit 308.

The virtual memory 402 is formed of n separate virtual address spaces. In other words, in this example the number of virtual address spaces of the virtual memory 402 is equal to the number of page frames of the buffer 324. Each virtual address space is a range of virtual addresses that can be addressed. Each virtual address space is formed of a plurality of contiguous pages, denoted $Page_{ij}$. The index i denotes the virtual address space of which the page $Page_{ij}$ forms part, and the index j denotes the page within that virtual address space.

The number of contiguous pages in each virtual address space is denoted p, where p is an integer greater than 1. Thus, there are n×p virtual pages in total in the virtual memory. The value of p can vary by implementation. In some examples, p may be equal to 2. In other examples, p may be equal to 3, 4, 5 or some other integer. In other examples, p may be a larger value, e.g. greater than 10, 20, 50 etc. The value of p may be chosen such that the virtual address space is sufficiently large to contain the largest allocation supported by the system. If the largest allocation fits within $p_{max}$ pages, then p may be set to $p_{max}+1$, such that the largest allocation may begin at any position within the first page of the virtual address space. In this example, the size (i.e. bit size) of a page of virtual memory is equal to the size of a memory page frame. In other examples, the size of a virtual page and a memory page frame may be different.

The virtual address spaces are independent of each other. That is, each virtual address space defines a range of virtual addresses that are independent of the range of virtual addresses defined by another virtual address space in the virtual memory. Thus, the maximum contiguous allocation size within the virtual memory 402 (expressed in bits) is equal to p×PageSize, where PageSize is the bit size of a page of the virtual memory. Since each address space is independent, a virtual address of the virtual memory 402 is defined in part by the combination of a virtual address space and the page within that virtual address space. An offset from the start of the page in the virtual address space may fully define the virtual address. In other words, a virtual address is defined by: i) a virtual address space; ii) a page within that virtual address space; and iii) an offset from the start of that page. The offset is limited to be contained within a page. The size of the offset is equal to an integer multiple of the smallest addressable unit of the virtual memory, where the integer multiple takes one of a set of specified values in the range 0 to K−1, where the value of K is such that the offset is constrained to be within the page. The smallest addressable unit of the virtual memory may be a byte, for example. In this case, the value K represents the byte size of the page. It follows that the bit-size of each virtual address is equal to $\log_2(p*n*K)$.

Each page frame of the buffer 324 may be associated with an index which uniquely identifies that page frame from within the set of n page frames. In this example, the values of the page frame index are in the range 0 to n−1. Each virtual address space of the virtual memory 402 is also associated with an index that identifies that virtual address space from the set of n virtual address spaces. In this example, the values of the virtual address space index are in the range 0 to n−1. Each page frame index is mapped to a respective virtual address space index. Thus, each page frame of the buffer 324 is mapped, or associated with, a respective virtual address space. Each page frame of the buffer 324 may be uniquely mapped to a respective virtual address space; i.e. there may be a one-to-one mapping between page frames of the buffer 324 and virtual address spaces. The mapping between the page frames of buffer 324 and virtual address spaces may be fixed. Each page frame index may be uniquely mapped to a respective virtual address space index. The indexes may be mapped according to some specified mapping. In the present example, the indexes are mapped so that page frame 0 is associated with virtual address space 0; page frame 1 is associated with virtual address space 1 and so on. In other words, according to the examples described herein page, frame i is associated with address space i.

The mapping between the page frame indices and virtual address space indices controls how page frames are mapped to pages of the virtual memory. This will be described in more detail below.

The MMU 318 operates to manage the allocation of the page frames in buffer 324 to pages of virtual memory 402 through use of a virtual memory table.

Figure 5:
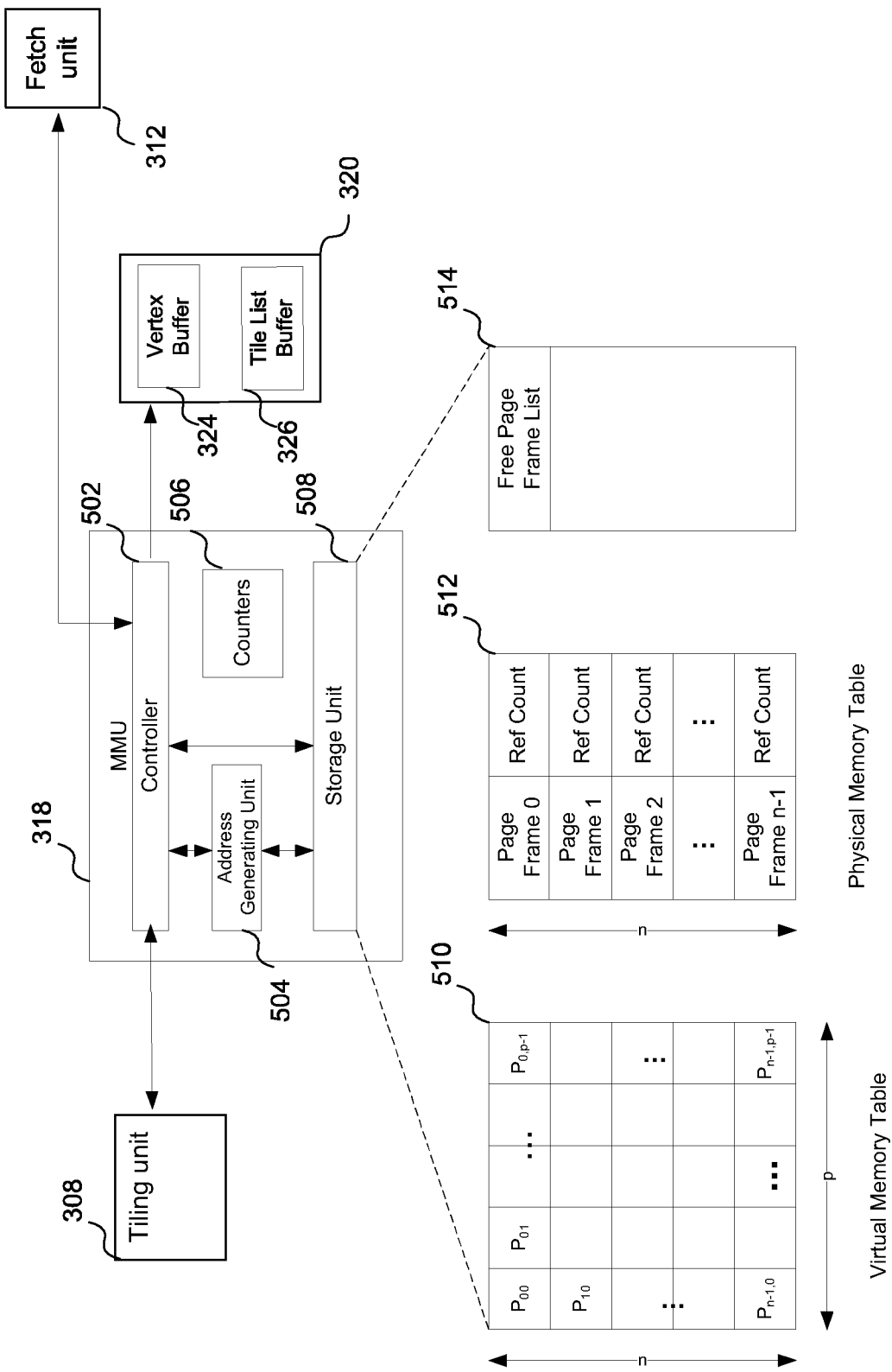
FIG. 5 shows a more detailed view of a memory management unit of the graphics processing system of FIG. 3, including a schematic illustration of the stored virtual memory table and physical memory table.

FIG. 5 shows a more detailed view of the MMU 318. The MMU 318 is shown coupled to the tiling unit 308, memory portion 320 and the fetch unit 312. The remaining components of the graphics processing system have been omitted for the purposes of clarity.

The MMU 318 comprises a controller 502, address generating unit 504 (which may be referred to herein as an "address calculating unit" 504), a plurality of counters 506 and a storage unit 508.

The storage unit 508 stores the virtual memory table 510, a physical memory table 512 and a free page frame list 514.

The virtual memory table 510 specifies mappings between the page frames of the buffer 324 and pages of the virtual memory 402. The virtual memory table 510 contains n×p entries. Each entry of the virtual memory table corresponds to a respective page of the virtual memory. That is, each entry of the virtual memory table is associated with a respective page of the virtual memory. Each entry in the virtual memory table 510 can store a single mapping between its corresponding page of virtual memory and a page frame of buffer 324.

The virtual memory table 510 is arranged as an array formed of n sets of p contiguous entries. In other words, virtual memory table 510 is arranged as an array formed of a number of sets of p contiguous entries, where the number of sets of p contiguous entries is equal to the number n of page frames in the buffer 324. Each set of p contiguous entries is associated with, or corresponds to, the p contiguous pages within a respective virtual address space of the virtual memory 402. Thus, each set of p contiguous entries in the virtual memory table is associated with a respective virtual address space. Each of the p entries in a set is associated with a respective page within the virtual address space associated with that set.

In the example illustrated here, the virtual memory table is a 2D array formed of n rows and p columns; i.e. n rows each formed of p entries. Each row of entries of the memory table is associated with a respective virtual address space, with each entry within that row being associated with a corresponding page within that virtual address space. It will be appreciated that in other examples, the virtual memory table could be an array formed of p rows and n columns (i.e. n columns each formed of p entries), in which case each column of the virtual memory table would be associated with a respective virtual memory address space.

Figure 6:
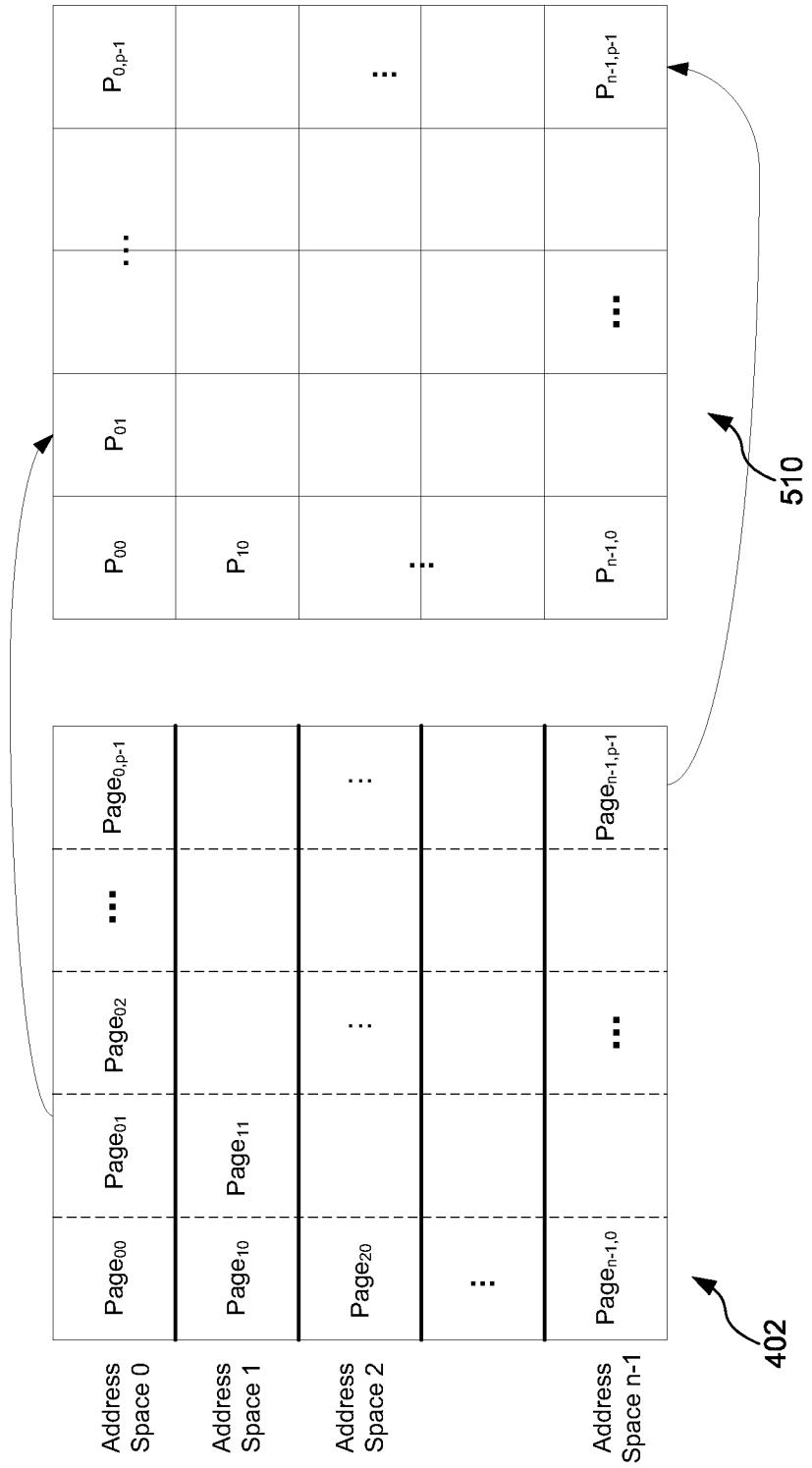
FIG. 6 shows the relationship between an array of virtual memory pages and the virtual memory table.

The relationship between the virtual memory 402 and the virtual memory table 510 is illustrated in FIG. 6.

There is a one-to-one association between pages $Page_{ij}$ of the virtual memory 402 and entries $P_{ij}$ of the virtual memory table 510. In this way, the virtual memory table 510 identifies the n different virtual address spaces through its n sets of p contiguous entries (in this example, its n rows each of p entries) and each of the p pages within a virtual address space through the p entries of the set corresponding to that virtual address space.

This one-to-one association is illustrated in FIG. 6, with page $Page_{01}$ of virtual memory 402 shown associated with entry $P_{01}$ of the virtual memory table 510, and page $Page_{n-1,p-1}$ of virtual memory 402 shown associated with entry $P_{n-1,p-1}$ of virtual memory table 510. Thus, entry $P_{01}$ specifies the mapping between page $Page_{01}$ and a page frame of physical memory, and entry $P_{n-1,p-1}$ specifies the mapping between page $Page_{n-1,p-1}$ and a page frame of physical memory. It is appreciated that, although each page of virtual memory is associated with a respective entry in the virtual memory table, only two such associations are explicitly shown in FIG. 6 for clarity.

Referring back to FIG. 5, the physical memory table 512 contains n entries each containing an indication of a respective page frame of the buffer 324. Each page frame indication may be the page frame address, or alternatively be a reference to the page frame address. The table 512 also stores a set of n reference count values. Each reference count value is associated with a respective page frame. The reference count values may be maintained by the counters 506 within the MMU 318. The reference count value for a page frame may indicate the number of primitives within each of the primitive blocks stored within that page frame that are active within the graphics processing unit 300 (i.e. being processed by the graphics processing unit 300). That is, the reference count value may indicate the number of primitives within each of the primitive blocks stored within that page frame for which processing by the graphics processing unit 300 has yet to complete. When the reference count value for a page frame indicates that there are no primitives within the primitive blocks stored within that page frame that are being processed by the graphics processing unit 300 (i.e., the graphics processing unit 300 has completed its processing for all primitives within the primitive blocks stored within the page frame), that page frame is added to the free page frame list 514 by the controller 502. A reference count value of zero may indicate that a page frame can be added to the free page frame list.

The free page frame list 514 identifies each free page frame within the buffer 324. A 'free' page frame may also be referred to as a deallocated page frame. A free page frame is a page frame that can be reallocated. In other words, a free page frame is a page frame to which new data (e.g. from tiling unit 308) can be written. A free page frame may refer only to page frames for which the whole page frame is deallocated/can be reallocated. Thus, when a page frame is identified in the free page frame list 514, that page frame is free to be reallocated.

When a page frame identified on the free page frame list 514 is reallocated (e.g., when new data is written to that page frame, or when the page frame is mapped to a page of virtual memory 402), the page frame is removed from the free page frame list. The management of the free page frame list (i.e. the addition and removal of page frames to and from the list) may be controlled by the controller 502.

Figure 7:
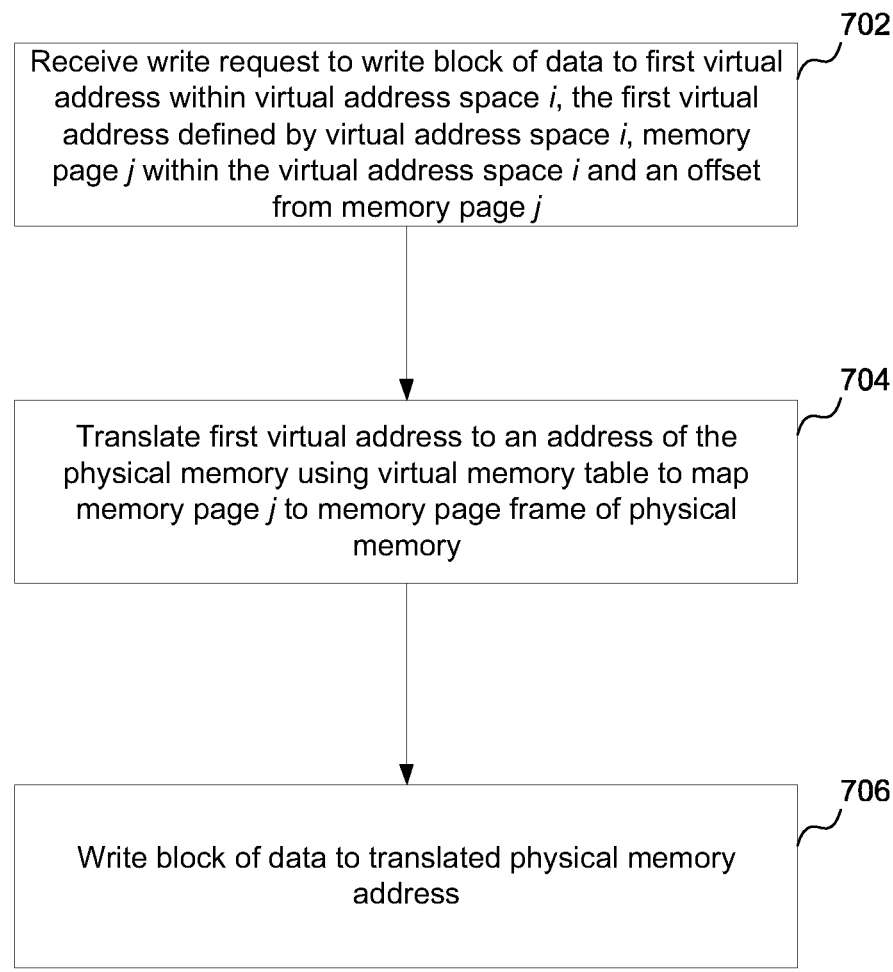
FIG. 7 is a flowchart of steps of a write operation for writing to a physical memory performed by a controller in response to receiving a write request.

The operation of the MMU 318 to write a block of data to buffer 314 in response to a write request from the tiling unit 308 will now be described with reference to the flowchart shown in FIG. 7.

At step 702, the MMU 318 receives a write request from the tiling unit 308 to write a block of data to a virtual memory address. The block of data may be primitive block data. The write request may be received at the controller 502. The virtual memory address addresses a region of virtual memory 402. The virtual memory address is defined by a virtual address space i, a memory page j within the virtual address space i and an offset from the memory page j. The page j within the virtual address space i is $Page_{ij}$.

In this example, for illustration, the virtual address space i is taken to be virtual address space 0, and memory page j within virtual address space i is taken to be page 0 within virtual address space 0, i.e. $Page_{00}$. Thus, the virtual address in this example is defined by $Page_{00}$ and the offset relative to $Page_{00}$.

At step 704, the controller 502 translates the virtual address to an address of the physical memory (in this example the buffer 324) using the virtual memory table 510 to map memory page j of virtual address space i (in this example $Page_{00}$) to a page frame of the memory.

To translate the virtual address to the physical memory address, the controller 502 may first access the virtual memory table 510 to identify if a mapping between $Page_{00}$ and a page frame of memory 324 is already specified. The controller 502 may access the entry of the virtual memory table 510 associated with the page of virtual memory $Page_{00}$. In this example, the entry of virtual memory table 510 that is associated with $Page_{00}$ is the entry $P_{00}$. If entry $P_{00}$ of the virtual memory table does not specify a mapping between $Page_{00}$ and a page frame of memory 324, the controller may select a page frame from the list of free page frames 514 and update the virtual memory table 510 to specify a mapping between $Page_{00}$ of virtual memory 402 and the selected page frame of memory 324. The table may be updated by updating the entry associated with $Page_{00}$ to specify the mapping between that page and the selected page frame of memory 324. The selected page frame of memory 324 mapped to $Page_{00}$ is then used to generate the physical memory address.

If entry $P_{00}$ of the virtual memory table 510 associated with $Page_{00}$ of virtual memory 402 does specify a mapping between $Page_{00}$ and a page frame of memory 324, that page frame of memory is then used to generate the physical memory address.

In the present example, it is assumed that $Page_{00}$ is mapped to page frame 0 of the memory 324.

Figure 8:
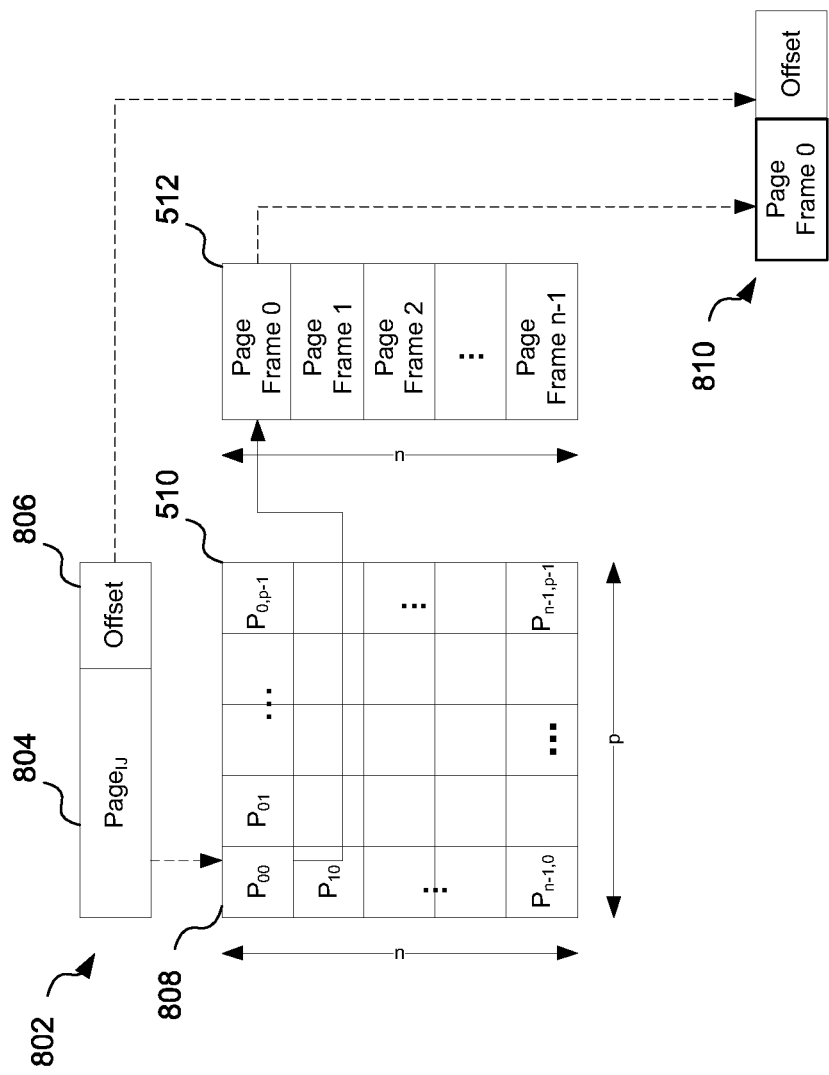
FIG. 8 schematically illustrates translating a virtual address of the present disclosure to an address of physical memory.

FIG. 8 illustrates how the controller 502 translates the virtual memory address to an address of buffer 324.

The virtual memory address is illustrated at 802. The virtual memory address is defined by the virtual address space 0 and page 0 within virtual address space 0 (i.e., $Page_{00}$), identified at 804; and an offset 806 relative to $Page_{00}$. The controller 502 accesses the entry of virtual memory table 510 associated with $Page_{00}$, which is entry $P_{00}$, denoted 808. Entry $P_{00}$ of virtual memory table 510 specifies that $Page_{00}$ is mapped to page frame 0 of memory 314. Controller 502 then accesses the address of page frame 0 mapped to $Page_{00}$ using the physical memory table 512. In other words, the controller 502 uses the virtual memory table 510 to identify the page frame mapped to $Page_{00}$ of virtual memory 402 (in this example page frame 0). The controller may then access the physical memory table 512 to determine the address of identified page frame 0. It is noted that the reference count values stored in the physical memory table 512 are omitted in FIG. 8 for clarity. The controller then generates the physical memory address 810 of buffer 324 from the address of page frame 0 and the offset 806. In other words, the translated physical memory address 810 is defined by the page frame mapped to $Page_{00}$ of the virtual memory 402 as specified by the virtual memory table 510, and the offset of the virtual memory address 802.

Having generated the physical memory address 810 from the received virtual memory address 802, at step 706 the controller 502 writes the block of data to the physical memory address 810 of the buffer 324.

Figure 9:
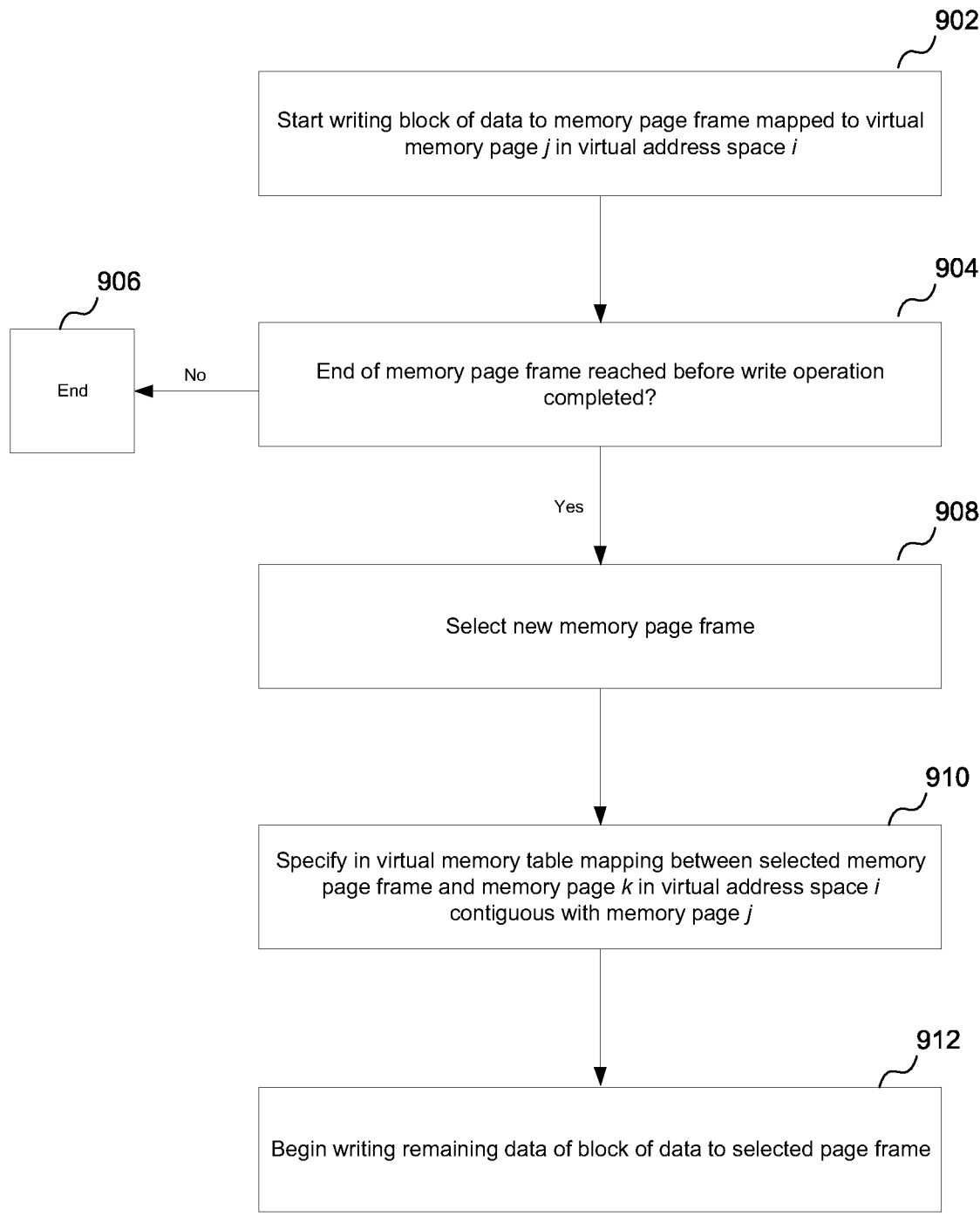
FIG. 9 shows a flowchart of steps of the write operation for writing to physical memory when the data to be written spans multiple page frames.

In some situations, the block of data requested to be written to the virtual memory address will exceed the available free space of the page frame. When this situation occurs, the MMU 318 selects a new page frame of physical memory 314 to continue writing the block of data to physical memory. The operation of the controller in these situations will now be described with reference to the flow chart in FIG. 9.

At step 902, the controller 502 starts writing the block of data to the page frame mapped to virtual memory page j in virtual address space i. To continue the previous examples, the controller starts writing the block of data to page frame 0 of buffer 324 that is mapped to virtual page $P_{00}$ specified by the virtual address.

At step 904, the controller 502 determines whether the end of the page frame 0 has been reached before the write operation has been completed. In other words, it is determined whether the end of page frame 0 (i.e., the boundary between that page frame and the next page frame of buffer 324) is reached before all of the data block has been written to the buffer. If the write operation completes before the boundary of page frame 0 is reached, the process ends (step 906).

If the controller 502 determines that the end of page frame 0 has been reached before the block of data has finished writing to memory (i.e., before the write operation has completed), the controller selects a new page frame (i.e. a "further page frame") of buffer 324 (step 908).

The controller 502 selects the further page frame from the list of available free page frames 514.

At step 910, the controller updates the virtual memory table 510 to specify the mapping between the further page frame selected from the free page frame list 514 and a second memory page k in virtual address space i that is contiguous with the previous memory page j. Within each virtual address space, if data is to be written to multiple memory pages, then the data is written to memory pages sequentially according to a specified order. Each memory page to be written to is contiguous with the previous memory page written to. That is, during a write operation, if a memory page within a virtual address space becomes full, data is written to a next memory page contiguous with that memory page. In the examples described herein, page frames $page_{ij}$ within a virtual address space are written to in order of increasing j. In this way, it can be known that memory page k contiguous with the previous memory page j will be free. The controller updates the virtual memory table 510 by updating the entry associated with the page k contiguous with previous page j to specify the mapping between page k and the further page frame of buffer 324.

At step 912, the controller begins writing remaining data of the block of data to the selected further page frame of buffer 324.

Figure 10:
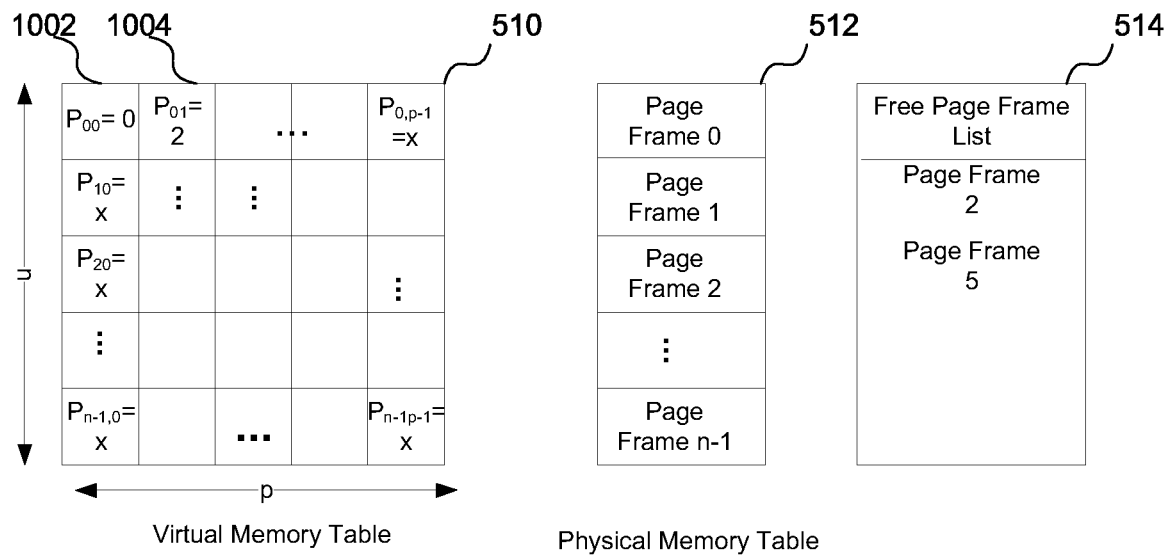
FIG. 10 shows an example of how the virtual memory table is updated when a data block is written that spans two page frames.

Steps 910 and 912 are illustrated in FIG. 10. As described above, the data block is initially written to page frame 0 of buffer 324, which is mapped to $Page_{00}$ of the virtual memory (i.e., page j of address space i). The entry of virtual memory table 510 associated with $Page_{00}$ (entry $P_{00}$) specifies this mapping between $Page_{00}$ and page frame 0 (denoted at 1002). When the end of page frame 0 is reached before the whole of the data block has been written to buffer 324, the controller 502 selects an additional page frame from the list of available page frames to continue writing to. In the example here, the available page frames listed in the free page frame list 514 include page frame 2 and page frame 5 of buffer 324. In the current example, the controller 502 selects page frame 2 as the further page frame to write to.

The controller then updates the virtual table 510 to specify a mapping between selected page frame 2 and the next page in virtual memory contiguous with $Page_{00}$, which as shown in FIGS. 4 and 6 is $Page_{01}$. $Page_{01}$ is in the same virtual address space as $Page_{00}$ (virtual address space 0) and is contiguous with it (i.e. $Page_{01}$ is page k). The controller 502 updates the virtual memory table 510 by specifying the mapping between page frame 2 of buffer 324 and $Page_{01}$ of virtual memory 402 in the table entry associated with $Page_{01}$, which in this example is entry $P_{01}$ as illustrated in FIG. 6. The updated table entry specifying this mapping is shown in FIG. 10 at 1004.

Page frame 2 may then be removed from the list of available page frames in free page frame list 514.

Thus, the controller 502 writes the data block to multiple (potentially non-contiguous) page frames of buffer 324 that are mapped by the virtual memory table 510 to contiguous pages of the virtual memory 402 within a single virtual memory address space.

Steps 904 to 912 can be repeated until the whole block of data has been written to buffer 324.

The above examples illustrate how a block of data can be written to buffer 324 during a write operation performed by the MMU 318 in response to receiving a write request. For the purposes of illustration, it was assumed in these examples that there was sufficient memory available in the buffer 324 to store the data for the write request (i.e. there was sufficient memory available to complete the write operation). However, it will be appreciated that, in some circumstances, the MMU 318 might receive a write request to write a block of data that exceeds the available memory in buffer 324. To handle these situations the MMU 318 might, in response to receiving each write request, determine whether there is sufficient available memory (e.g. a sufficient number of free page frames) within buffer 324 to complete the write operation (i.e. to write the block of data indicated in the write request). This step might be performed by the MMU after step 702 and before step 704. The size of the data block to be written might be indicated in the write request, which would enable the MMU 318 to determine whether there is sufficient available memory in buffer 324 to complete the write operation. This determination might be made by the controller 502.

If it is determined that there is sufficient available memory in buffer 324 to complete the write operation, the MMU 318 proceeds to perform the write operation in accordance with the examples above. The MMU 318 might, in response to determining that there is not sufficient available memory in buffer 324 to complete the write operation, halt performance of the write operation until sufficient memory to complete the write operation is made available in buffer 324. That is, the MMU 318 might only proceed to perform step 704 of translating the virtual address to a physical memory address and/or begin writing the data block to the buffer 324 once it is determined that there is sufficient memory available in the memory 324 to complete the write operation. Alternatively, the MMU 318 might proceed to initiate writing the block of data to the buffer 324 using the available space within the buffer and to pause the write operation to wait for further memory to become available once the buffer is full. That is, the MMU 318 might, in response to determining that there is insufficient available memory in buffer 324 to complete the write operation, initiate the write operation if there is available—albeit an insufficient amount of—memory in the buffer 324. The MMU might then pause the write operation when there is no longer any available memory in the buffer 324 and resume the write operation upon memory being made available within the buffer. The process of pausing and resuming the write operation may continue until the write operation is complete (i.e. until all of the data block indicated in the write request has been written to the buffer 324).

After the write operation has been completed (i.e. after the block of data has been written to buffer 324), the controller 502 receives from the tiling unit 308 a request for a new virtual memory address to write to. The controller 502 may receive such a request after every write operation is completed.

The requests submitted to the controller 502 may be one of two types. The first type of request is a request for a new virtual memory address that maps to the same page frame of buffer 324 as the last page frame the previous (i.e. most recent) block of data was written to (i.e. the last page frame the block of data was written to in the last write operation). Here, the last page frame refers to the page frame containing the end of the previous data block, i.e. the most recently written to page frame.

The second type of request is a request for a new virtual memory address that maps to a new page frame of buffer 324. A new page frame refers to a page frame that is different from the page frame containing the end of the previously-written data block.

Figure 13:
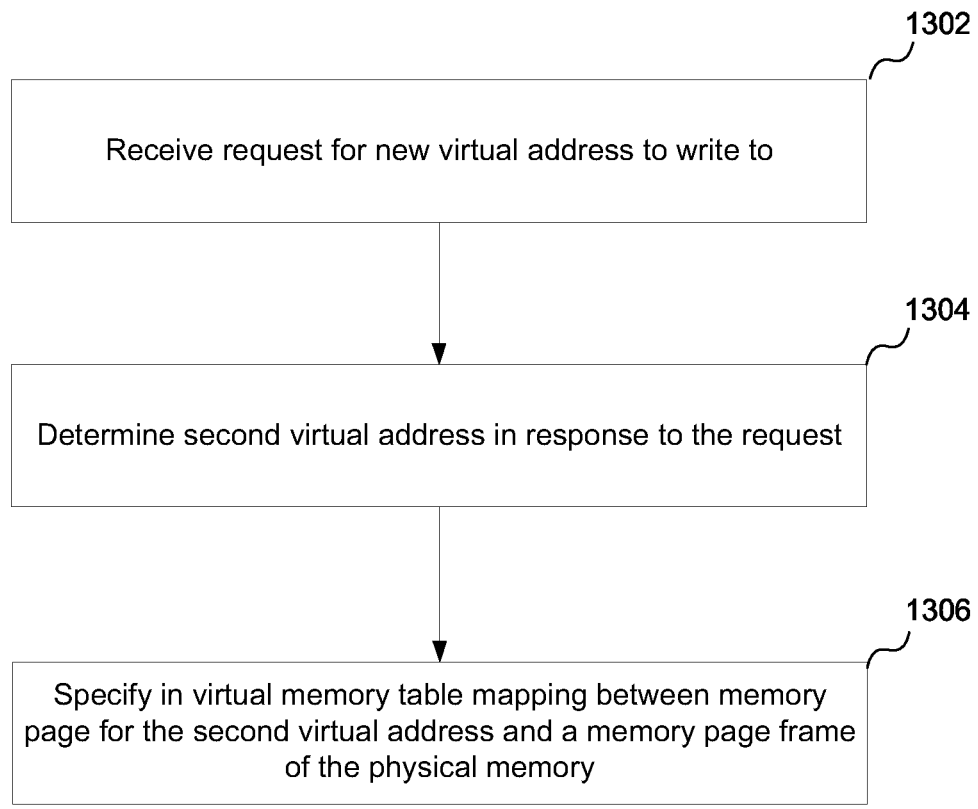
FIG. 13 shows a flowchart of steps performed in response to receiving a request for a new virtual memory address.

Approaches to generating these additional virtual memory addresses in response to receiving a request will now be described with reference to the flow chart in FIG. 13. At step 1302, the controller 502 receives a request for a new virtual memory address to write to. As stated above, the received request may be of the first type or the second type.

At step 1304, the MMU 318 determines a virtual memory address in response to the received request. For clarity, this virtual memory address may be referred to as a second virtual memory address to distinguish it from the virtual memory address received at step 702 of FIG. 7. This second virtual address is defined by a virtual address space i', a page j' within the virtual address space i' (denoted Paged, and an offset from page j'.

Step 1304 may be performed by the address calculating unit 504. The address calculating unit may determine the second virtual address by selecting a page frame of the buffer 324 in dependence on the type of request received at step 1302. Having selected the page frame of the buffer 324 in dependence on the type of request, the address calculating unit selects a virtual address space i' for the second virtual address that is different from the virtual address space i of the previous virtual address received at step 702. The unit 504 selects as the virtual address space i' for the second virtual address the virtual address space having an index that maps to the index of the selected page frame of the buffer 324.

At step 1306, the MMU 318 specifies in the virtual memory table 510 the mapping between the memory page j' within address space i' for the determined second virtual address and a page frame of buffer 324. The MMU may specify in the virtual memory table the mapping between the page frame selected to determine the second virtual address (e.g. the page frame selected in dependence on the type of received request), and the memory page j'.

Once the second virtual address has been generated, it may be communicated back to the tiling unit. This may be performed by the controller 502.

The first type of request is a request for a new virtual memory address that maps to the same page frame of buffer 324 as the last page frame the previous (i.e. most recent) block of data was written to. Thus, in response to the controller 502 receiving a first type of request, the address calculating unit 504 selects as the page frame the last page frame the previous block of data was written to. In our current example, that is page frame 2 (as shown in FIG. 10). The address calculating unit 504 then selects as the virtual address space i' for the second virtual address the virtual address space with the index that maps to the index of the last page frame the previous block of data was written to. Thus, to continue our example, the virtual address space having an index that maps to the index of page frame 2 is selected as virtual address space i'. In the current example, the index of page frame 2 maps to the index of virtual address space 2. Thus, the controller 502 selects address space 2 as the virtual address space i' in response to receiving the first type of request.

The address calculating unit then needs to determine the page j' within the virtual address space i', and the offset from page j' to define the second virtual address.

The address calculating unit 504 selects as the memory page j' within the virtual address space i' a terminal page within the virtual address space (e.g. the first or last page within the virtual address space). In this current example, the address calculating unit 504 selects the first page within the virtual address space i', and thus, would select page 0 within virtual address space 2 (i.e., $Page_{20}$).

Because the first type of request requests a virtual memory address mapped to the last page frame the last block of data was written to, it is important that the offset of the second virtual address is not smaller than the offset of the end of the data block within that page frame. Thus, the address calculating unit 504 may select the offset of the second virtual address to be greater than the offset of the end of the data block from the last write operation. In other words, the address calculating unit may set the offset of the second virtual address to be equal to the first free (i.e. available) offset within the last page frame the last block of data was written to.

Thus, in this example, in response to receiving a first type of request after the last write operation that wrote a data block to page frame 0 and page frame 2 of the buffer 324, the address calculating unit generates a second virtual address defined by virtual address space 2 (which is the address space mapped to page frame 2), page 0 within virtual address space 2 (i.e. $Page_{20}$), and an offset equal to the first available offset within page frame 2.

Figure 11:
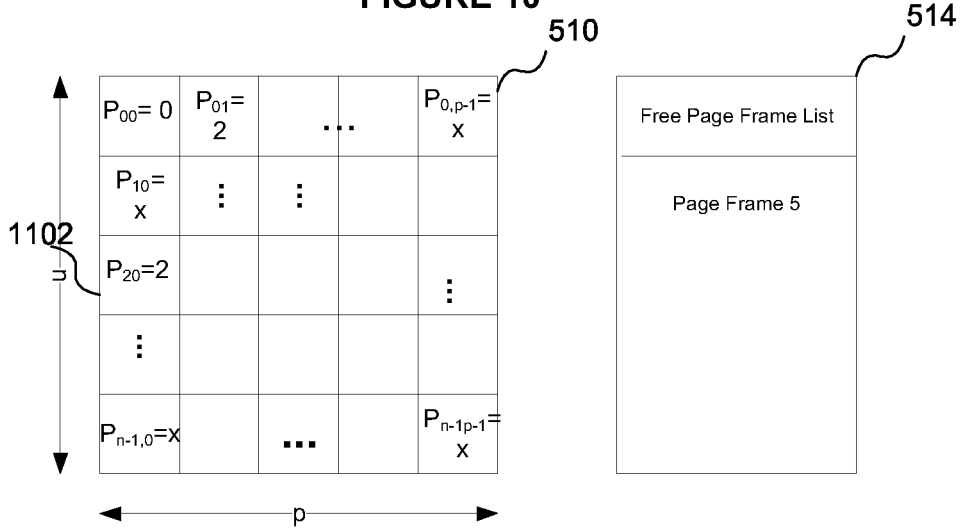
FIG. 11 shows an example of how the virtual memory table is updated in response to receiving a first type of request for a new virtual address following a write operation.

Having calculated the second virtual address, the address generating unit 504 updates the virtual memory table 510 to specify the mapping between $Page_{20}$ and page frame 2. In particular, the unit 504 updates the virtual memory table by specifying the mapping in the entry associated with $Page_{20}$ (which in this example is entry $P_{20}$). This is illustrated in FIG. 11, where 1102 denotes the updated entry $P_{20}$ after the second virtual address is generated in response to receiving the first type of request.

In a further example, where the previous block of data was written to the first page of a virtual address space, and where the page was not filled, the virtual address space i' selected for the second virtual address will be the same virtual address space i as that of the previous block of data. For example, after generating the virtual address in virtual address space 2, and updating entry $P_{20}$ at 1102, a data block may be written such that the end of the data block remains within page frame 2. In response to receiving a further first type of request a virtual address is generated in the virtual address space with the index that maps to the index of the last page frame the previous block of data was written to. In this example that index is 2, i.e. the virtual address space remains the same. In other words, in response to receiving a first type of request after writing a block of data to the first page of a virtual address space where that block is entirely within the first page (i.e. the end of the block remains within the first page), a virtual address is generated in that same virtual address space. It can therefore be seen that it is possible for a number of smaller allocations to be made in the same virtual address space, provided they all begin within the first page of the virtual address space. This enables data to be written to the same virtual address space until the first page of that space is full. Because the number of virtual address spaces is the same as the number of page frames, this conveniently means it is possible to not run out of virtual address spaces until the physical memory space has also run out.

The second type of request is a request for a new virtual memory address that maps to a new page frame of buffer 324.

Thus, in response to the controller 502 receiving a second type of request, the address calculating unit 504 performs step 1304 by selecting a page frame from the free page frame list 514. The address calculating unit 504 then selects as the virtual address space i' for the second virtual address the virtual address space with the index that maps to the index of the selected page frame. In the present example, it can be seen with reference to FIG. 10 that following the previous write operation, page frame 2 will be removed from the free page frame list 514, but page frame 5 will remain. Thus, in response to receiving a second type of request after that write operation, address calculating unit 504 will select page frame 5 from the list 514, and select as the virtual address space i' for the second virtual address the virtual address space with the index that maps to the index of selected page frame 5. In the current example, the index of page frame 5 maps to the index of virtual address space 5. Thus, the controller 502 selects address space 5 as the virtual address space i' of the second virtual memory address in response to receiving the second type of request.

The address calculating unit then needs to determine the page j' within the virtual address space i', and the offset from page j' to define the second virtual address.

The address calculating unit 504 selects as the memory page j' within the virtual address space i' a terminal page within the virtual address space (e.g. the first or last page within the virtual address space). Thus, to continue our current example in which the first page within address space i' is selected, the address calculating unit 504 would select page 0 within virtual address space 5 (i.e., $Page_{50}$).

Because the second type of request requests a virtual memory address mapped to a free page frame, the address calculating unit 504 may select the offset of the second virtual address to be zero to maximise memory usage.

Thus, in this example, in response to receiving a second type of request after the last write operation that wrote a data block to page frame 0 and page frame 2 of the buffer 324, the address calculating unit 504 generates a second virtual address defined by virtual address space 5 (which is the address space mapped to page frame 5), page 0 within virtual address space 5 (i.e. $Page_{50}$), and a zero offset from $Page_{50}$.

Figure 12:
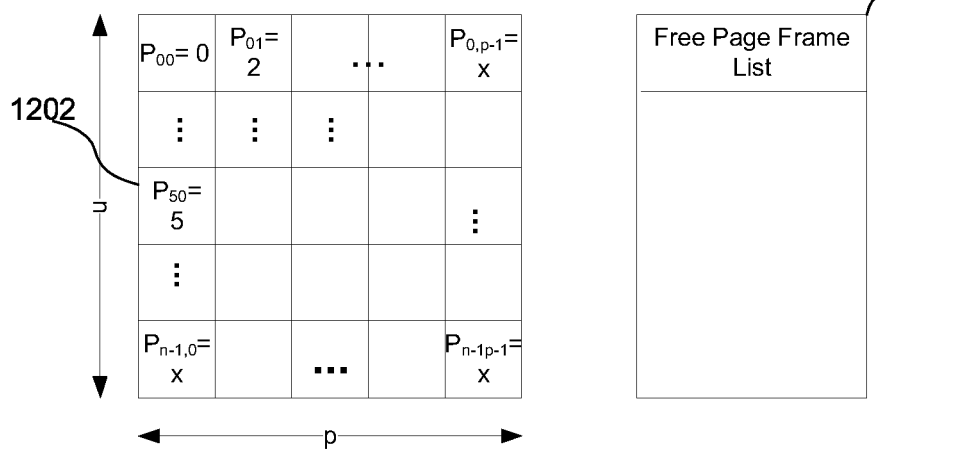
FIG. 12 shows an example of how the virtual memory table is updated in response to receiving a second type of request for a new virtual address following a write operation.

Having calculated the second virtual address in response to receiving the second type of request, the address generating unit 504 updates the virtual memory table 510 to specify the mapping between $Page_{50}$ and page frame 5. In particular, the unit 504 updates the virtual memory table by specifying the mapping in the entry associated with $Page_{50}$ (which in this example is entry $P_{50}$). This is illustrated in FIG. 12, where 1202 denotes the updated entry $P_{50}$ after the second virtual address is generated in response to receiving the second type of request. Page frame 5 may then be removed from the list of available page frames in free page frame list 514.

The use of the first and second type of requests for a new virtual address issued after each write operation enable the graphics processing system 300 to support multiple data streams in parallel. A data stream, or simply 'stream' for brevity, is a sequence of contiguous data that will be used (e.g. processed) together by the graphics processing unit 302. If the data is used together, it is preferable that the data in the stream is stored in the same page frame of buffer 324, because only whole page frames can be released, or deallocated, at a time. That is, it may not be possible to deallocate a segment of a page frame—the whole page frame may need to be deallocated together.

Thus, following completion of a writing operation to the buffer 324, when additional data for the same stream is to be written to the buffer, the tiling unit can issue a first type of request to the MMU so that the returned virtual memory address maps to the same page frame of the buffer. When data for a separate stream is to be written to the buffer, the tiling unit can issue a second type of request to the MMU so that the returned virtual address maps to a new page frame of the buffer.

In prior virtual memory addressing schemes such as that illustrated in FIG. 1, the support of m streams in parallel would require m virtual memory tables and a physical memory table. Each of those virtual memory tables may suffer from the wrap-around problem discussed above. This could be mitigated by making each of these m virtual tables larger than the physical memory table. Assuming the physical memory table had n entries and each virtual memory table were a factor p times larger than the physical memory table, storing m virtual tables would require $m \cdot n \cdot p \cdot \log_2(n \cdot p)$ bits. In addition, the size of each virtual memory address would be increased by a factor of $\log_2(m)$ bits, making the size of the virtual memory address $\log_2(p \cdot n \cdot K \cdot m)$, where K is the number of offsets within a page frame.

However, the virtual memory addressing scheme of the present disclosure enables m data streams to be supported in parallel with reduced storage costs. The virtual memory table described herein (e.g. table 510) is a factor p times larger than the size of the physical memory table, which contains n entries. Thus, storing the virtual memory table 510 requires $n \cdot p \cdot \log_2(n \cdot p)$ bits. Each virtual memory address has a size of $\log_2(p \cdot n \cdot K)$ bits. In other words, the virtual memory addressing scheme of the present disclosure enables m data streams to be supported in parallel with no extra storage requirements on the virtual memory table or virtual addresses compared to a conventional addressing scheme using an equivalent sized virtual memory that supports only a single data stream.

Read operations to read data from the buffer 324 will now be briefly described. A read request to read data from the buffer 324 may be issued by the fetch unit 312 and received by the MMU 318. A read request is a request to read a block of data from a virtual memory address. The virtual memory address specified in the read request may be specified by a virtual address space, a page frame within the virtual address space, and an offset from the page frame. The read request may also specify the size of the data block to be read from the virtual memory address.

In response to receiving a read request, the MMU 318 translates the virtual address specified in the request to one or more physical memory addresses for the buffer 324 and fetches the data from those addresses. The MMU can determine the pages of virtual memory 402 covered by the requested block of data from the virtual address specified in the read request and the size of the data block to be read. Having identified the pages of virtual memory covered by the requested block of data, the MMU accesses the virtual memory table 510 to determine the page frames of buffer 324 mapped to those pages. The MMU 318 accesses the entries of the virtual memory table associated with the pages of virtual memory covered by the requested block of data. Data can then be fetched from the page frames of buffer 324 mapped to the virtual page frames as specified by the virtual memory table.

Having fetched the data from the buffer 324 specified in the read request, the MMU 318 can send the fetched data to the fetch unit 312.

Aspects of a virtual memory addressing scheme have been described herein in which an addressable virtual memory is formed of multiple independent virtual address spaces each formed of multiple contiguous pages. The virtual memory addressing schemes described herein may present numerous advantages over conventional virtual memory addressing schemes that address virtual memory consisting of only a single virtual address space.

The use of multiple separate virtual address spaces means the addressing scheme described herein does not require a specific page to be freed, or deallocated, before an available page can be allocated. The use of multiple virtual address spaces means that many allocations may be allocated in their own virtual address space, rather than all allocations sharing a single virtual address space as in conventional systems. It frequently be the case that each allocation gets its own virtual address space (i.e., row in the virtual memory table). Each virtual address space can be made large enough (i.e. has enough pages, or columns in the virtual memory table) for the largest allocation supported by the system. The wrap-around problem is avoided so long as the virtual address spaces do not run out. However, by having the number of virtual address spaces to be equal to the number of page frames and enabling multiple allocations within the same virtual address space if those allocations remain within the first page of that address space, the virtual address spaces conveniently do not run out until the physical memory has also run out. Thus, the addressing scheme described herein can avoid the wrap-around problem associated with conventional virtual memory addressing schemes. The addressing scheme also supports the generation of new virtual addresses following a write operation in two different ways depending on the type of request for the new virtual address received. This enables multiple streams to be supported by the processing system in parallel with reduced storage requirements compared to conventional addressing schemes.

The virtual memory addressing scheme has been described herein with reference to a graphics processing system. It will be appreciated that the addressing scheme described herein could be implemented within different types of processing systems, for example within a CPU, which could be a single core or multi-core CPU. In this case, the memory management unit may receive write requests from a processing unit of the CPU, e.g. a processor core or an arithmetic logic unit.

Similarly, it will be appreciated that the vertex buffer 324 is just an example of physical memory that can be mapped to the virtual memory in accordance with the examples described herein. For example, tile list buffer 326 may also be mapped to virtual memory using the techniques described herein. In other examples, the physical memory mapped to the virtual memory could be some other memory portion of a computer processing system, and could be an on-chip or an off-chip memory. That is, though in FIG. 3 memory portion 320 (of which vertex buffer 324 and tile list buffer 326 form part) is an on-chip memory, it will be appreciated that in other examples memory portion 320 might be an off-chip memory.

In the examples described above, the virtual memory addressing scheme implemented by the MMU 318 is such that memory page $page_{i0}$ of the virtual memory is always mapped physical page i. Thus, in this implementation column '0' of the virtual memory table 510 (the first, or left-hand column) can be omitted from storage unit 508 because the mappings specified by these entries is implicit. In other words, the storage unit 508 may only store an $n \times (p-1)$ entry virtual memory table, the mappings specified by the omitted column of entries being implicit.

The memory management unit (MMU) of FIGS. 3 and 5 are shown as comprising a number of functional blocks. This is schematic only and is not intended to define a strict division between different logic elements of such entities. Each functional block may be provided in any suitable manner. It is to be understood that intermediate values described herein as being formed by a controller or unit need not be physically generated by the controller or unit at any point and may merely represent logical values which conveniently describe the processing performed by the controller or unit between its input and output.

The MMUs described herein may be embodied in hardware on an integrated circuit. The MMUs described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed in an integrated circuit manufacturing system configures the system to manufacture an MMU configured to perform any of the methods described herein, or to manufacture an MMU comprising any apparatus described herein. An integrated circuit definition dataset may be, for example, an integrated circuit description.

There may be provided a method of manufacturing, at an integrated circuit manufacturing system, an MMU as described herein. There may be provided an integrated circuit definition dataset that, when processed in an integrated circuit manufacturing system, causes the method of manufacturing an MMU to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS® and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture an MMU will now be described with respect to FIG. 14.

Figure 14:
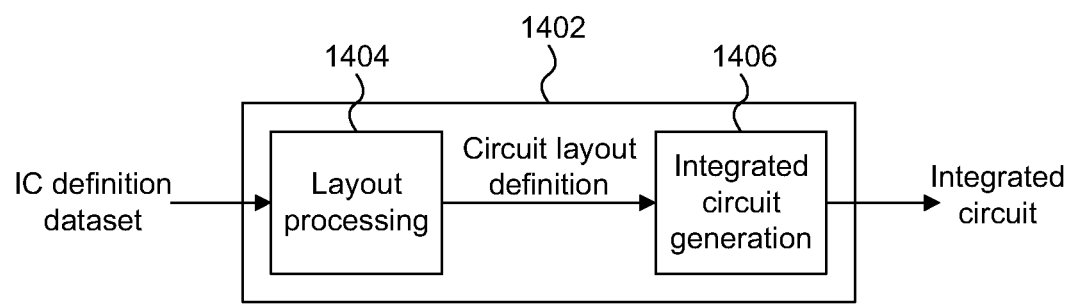
FIG. 14 shows an integrated circuit manufacturing system.

FIG. 14 shows an example of an integrated circuit (IC) manufacturing system 1402 which is configured to manufacture an MMU as described in any of the examples herein. In particular, the IC manufacturing system 1402 comprises a layout processing system 1404 and an integrated circuit generation system 1406. The IC manufacturing system 1402 is configured to receive an IC definition dataset (e.g. defining an MMU as described in any of the examples herein), process the IC definition dataset, and generate an IC according to the IC definition dataset (e.g. which embodies an MMU as described in any of the examples herein). The processing of the IC definition dataset configures the IC manufacturing system 1402 to manufacture an integrated circuit embodying an MMU as described in any of the examples herein.

The layout processing system 1404 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1404 has determined the circuit layout it may output a circuit layout definition to the IC generation system 1406. A circuit layout definition may be, for example, a circuit layout description.

The IC generation system 1406 generates an IC according to the circuit layout definition, as is known in the art. For example, the IC generation system 1406 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1406 may be in the form of computer-readable code which the IC generation system 1406 can use to form a suitable mask for use in generating an IC.

The different processes performed by the IC manufacturing system 1402 may be implemented all in one location, e.g. by one party. Alternatively, the IC manufacturing system 1402 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture an MMU without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 14 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 14, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The MMUs described herein may be embodied in hardware on an integrated circuit. The MMUs described herein may be configured to perform any of the methods described herein.

The implementation of concepts set forth in this application in devices, apparatus, modules, and/or systems (as well as in methods implemented herein) may give rise to performance improvements when compared with known implementations. The performance improvements may include one or more of increased computational performance, reduced latency, increased throughput, and/or reduced power consumption. During manufacture of such devices, apparatus, modules, and systems (e.g. in integrated circuits) performance improvements can be traded-off against the physical implementation, thereby improving the method of manufacture. For example, a performance improvement may be traded against layout area, thereby matching the performance of a known implementation but using less silicon. This may be done, for example, by reusing functional blocks in a serialised fashion or sharing functional blocks between elements of the devices, apparatus, modules and/or systems. Conversely, concepts set forth in this application that give rise to improvements in the physical implementation of the devices, apparatus, modules, and systems (such as reduced silicon area) may be traded for improved performance. This may be done, for example, by manufacturing multiple instances of a module within a predefined area budget.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A method of managing access to a physical memory, the method comprising:
receiving a request for a virtual address to write to, the physical memory being formed of n memory page frames using a set of virtual address spaces, said set comprising n virtual address spaces each formed of a plurality p of contiguous memory pages;
specifying a mapping between the virtual address and an address of the physical memory by determining the virtual address in response to the request in dependence on whether the request is a first type of request or a second type of request, the first type of request requesting that the virtual address maps to a same page frame of physical memory as a last page frame that a previous block of data was written to, and the second type of request requesting that the virtual address maps to a new page frame of physical memory; and
writing a block of data to the address of the physical memory.

2. The method as claimed in claim 1, further comprising, after specifying the mapping:
receiving a write request to write a block of data to the virtual address space; and
translating the virtual address to the address of the physical memory.

3. The method as claimed in claim 1, further comprising, prior to receiving the request for a virtual address to write to, writing the previous block of data to the physical memory.

4. The method as claimed in claim 1, wherein each of the n virtual address spaces has an index uniquely identifying that address space within the n virtual address spaces, and each memory page frame of the physical memory has an index uniquely identifying that memory page frame within the physical memory, wherein each of the virtual address space indices is mapped to a respective memory page frame index, and wherein the virtual address is defined by a virtual address space i, a memory page j within the virtual address space i, and an offset from the start of said memory page j.

5. The method as claimed in claim 4, wherein the method further comprises, if the block of data exceeds available space of the memory page frame in physical memory mapped to the memory page j within the virtual address space i:
selecting a further memory page frame from a list of available memory page frames;
specifying a mapping between the further memory page frame and a second memory page k in the virtual address space i contiguous with the memory page j; and
writing remaining data of the block of data to the further memory page frame.

6. The method as claimed in claim 4, wherein the specifying comprises specifying a mapping between the memory page j for the virtual address within the virtual address space i and a memory page frame of the physical memory.

7. A memory management unit for managing access to a physical memory, the memory management unit comprising:
a storage unit for storing a virtual memory specifying mappings between memory pages of virtual address spaces and memory page frames of the physical memory, the physical memory being formed of n memory page frames using a set of virtual address spaces, said set comprising n virtual address spaces each formed of a plurality p of contiguous memory pages; and
a controller configured to:
receive a request for a virtual address to write to;
specify a mapping between the virtual address and an address of the physical memory by determining the virtual address in response to the request in dependence on whether the request is a first type of request or a second type of request, the first type of request requesting that the virtual address maps to a same page frame of physical memory as a last page frame that a previous block of data was written to, and the second type of request requesting that the virtual address maps to a new page frame of physical memory; and
write a block of data to the address of the physical memory.

8. The memory management unit as claimed in claim 7, wherein the controller is further configured to, after specifying the mapping:
  receive a write request to write a block of data to the virtual address; and
  translate the virtual address to the address of the physical memory.

9. The memory management unit as claimed in claim 7, wherein each of the n virtual address spaces has an index uniquely identifying that address space within the n virtual address spaces, and each memory page frame of the physical memory has an index uniquely identifying that memory page frame within the physical memory, wherein each of the virtual address space indices is mapped to a respective memory page frame index.

10. The memory management unit as claimed in claim 7, wherein the virtual address is defined by a virtual address space i, a memory page j within the virtual address space i, and an offset from the start of said memory page j.

11. The memory management unit as claimed in claim 10, wherein the controller is further configured to, if the block of data exceeds available space of the memory page frame in physical memory mapped to the memory page j within the virtual address space i:
  select a further memory page frame from a list of available memory page frames;
  specify a mapping between the further memory page frame and a second memory page k in the virtual address space i contiguous with the memory page j; and
  write remaining data of the block of data to the further memory page frame.

12. The memory management unit as claimed in claim 10, wherein the memory management unit further comprises an address calculating unit configured to, responsive to the controller receiving a request for a virtual address to write to:
  determine the virtual address; and
  specify a mapping between the memory page j for the virtual address within the virtual address space i and a memory page frame of the physical memory.

13. The memory management unit as claimed in claim 12, wherein the address calculating unit is configured to determine the virtual address by:
  selecting a memory page frame of the physical memory in dependence on the type of request received; and
  selecting as the virtual address space i the virtual address space having an index that maps to the index of the selected memory page frame.

14. The memory management unit as claimed in claim 12, wherein the address calculating unit is one of:
  configured to, responsive to the controller receiving a first type of request:
    select the last memory page frame that the previous block of data was written to; and
    specify a mapping between the selected memory page frame and a memory page in the virtual address space i; and
  configured to, responsive to the controller receiving a second type of request:
    select a memory page frame from a list of available memory page frames; and
    specify a mapping between the selected memory page frame and a memory page in the virtual address space i.

15. The memory management unit as claimed in claim 14, wherein the address calculating unit is configured to one of:
  select as the virtual address space i the virtual address space with the index that maps to the index of the last memory page frame that the previous block of data was written to; and
  set the offset of the virtual address to be zero in response to receiving the second type of request.

16. The memory management unit as claimed in claim 15, wherein the address calculating unit is further configured to set the offset of the virtual address to be equal to the offset of the end of the previous block of data from the last memory page frame that said block of data was written to.

17. The memory management unit as claimed in claim 15, wherein the address calculating unit is further configured to select as the memory page j within the virtual address space i a terminal memory page within the virtual address space i.

18. The memory management unit as claimed in claim 14, wherein the address calculating unit is configured to one or more of:
  set the offset of the virtual address to be zero in response to receiving the second type of request;
  select as the virtual address space i the virtual address space with the index that maps to the index of the selected memory page frame; and
  select as the memory page j within the virtual address space i a terminal memory page within the virtual address space i.

19. The memory management unit as claimed in claim 7, wherein the memory management unit forms part of a graphics processing system configured to process graphics data to render an image of a scene, the memory management unit being configured to access the physical memory as part of processing the graphics data to render a scene.

20. An integrated circuit manufacturing system comprising:
  a non-transitory computer readable storage medium having stored thereon a computer readable dataset description of a memory management unit for managing access to a physical memory, the memory management unit including:
    a storage unit for storing a virtual memory specifying mappings between memory pages of virtual address spaces and memory page frames of the physical memory, the physical memory being formed of n memory page frames using a set of virtual address spaces, said set comprising n virtual address spaces each formed of a plurality p of contiguous memory pages, and
    a controller configured to:
    receive a request for a virtual address to write to,
    specify a mapping between the virtual address and an address of the physical memory by determining the virtual address in response to the request in dependence on whether the request is a first type of request or a second type of request, the first type of request requesting that the virtual address maps to a same page frame of physical memory as a last page frame that a previous block of data was written to, and the second type of request requesting that the virtual address maps to a new page frame of physical memory, and
    write a block of data to the address of the physical memory;
  a layout processing system configured to process the computer readable description so as to generate a circuit layout description of an integrated circuit embodying the memory management unit; and an integrated circuit generation system configured to manufacture the memory management unit according to the circuit layout description.

* * * * *